(12) United States Patent
Nagaraja et al.

(10) Patent No.: US 11,310,009 B2
(45) Date of Patent: Apr. 19, 2022

(54) REFERENCE SIGNAL ACQUISITION

(71) Applicant: QUALCOMM Incorporated, San Diego, CA (US)

(72) Inventors: Sumeeth Nagaraja, San Diego, CA (US); Tao Luo, San Diego, CA (US); Sony Akkarakaran, Poway, CA (US); Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/970,816

(22) Filed: May 3, 2018

(65) Prior Publication Data
US 2018/0323927 A1 Nov. 8, 2018

Related U.S. Application Data

(60) Provisional application No. 62/502,353, filed on May 5, 2017.

(51) Int. Cl.
*H04L 5/00* (2006.01)
*H04W 36/00* (2009.01)

(52) U.S. Cl.
CPC ............ *H04L 5/0048* (2013.01); *H04L 5/005* (2013.01); *H04L 5/0057* (2013.01);
(Continued)

(58) Field of Classification Search
CPC ... H04L 5/0048; H04L 5/0057; H04L 5/0098; H04L 5/0078; H04L 5/0089; H04L 5/005;
(Continued)

(56) References Cited

U.S. PATENT DOCUMENTS 10,057,004 B2 * 8/2018 Cao ................. H04J 11/0073
10,148,333 B2 * 12/2018 Ji ...................... H04B 7/0626
(Continued)

FOREIGN PATENT DOCUMENTS

CN 103297153 A 9/2013
CN 105007600 A 10/2015
(Continued)

OTHER PUBLICATIONS

Nam et al., "Method and Apparatus for reference signals in wireless systems", Apr. 11, 2017, Samsung Electronincs Co., Ltd., U.S. Appl. No. 62/484,193, pp. 1-40 (Year: 2017).*
(Continued)

*Primary Examiner* — Shah M Rahman
(74) *Attorney, Agent, or Firm* — Loza & Loza, LLP/Qualcomm Incorporated

(57) ABSTRACT

Various aspects of the disclosure relate to techniques associated with the acquisition of reference signals. In some aspects, a network may request a user equipment (UE) to measure a timing difference between neighbor cells and use that information to generate a CSI-RS configuration. The network sends the CSI-RS configuration to the UE to enable the UE to acquire a CSI-RS from a neighbor cell. In some aspects, a network may send timing-related information to a neighbor cell and the neighbor cell uses that information to transmit a CSI-RS.

14 Claims, 15 Drawing Sheets

(52) U.S. Cl.
CPC ....... *H04L 5/0098* (2013.01); *H04W 36/0072* (2013.01); *H04L 5/0053* (2013.01); *H04L 5/0092* (2013.01)

(58) Field of Classification Search
CPC . H04L 5/0053; H04L 5/0092; H04W 36/0072
See application file for complete search history.

(56) References Cited

U.S. PATENT DOCUMENTS

| | | | | |
|---|---|---|---|---|
| 2012/0294213 | A1* | 11/2012 | Chen | H04L 27/06 370/311 |
| 2013/0039203 | A1* | 2/2013 | Fong | H04B 7/024 370/252 |
| 2013/0163569 | A1* | 6/2013 | Lee | H04L 1/0045 370/336 |
| 2013/0322376 | A1* | 12/2013 | Marinier | H04W 72/06 370/329 |
| 2014/0044040 | A1* | 2/2014 | Chen | H04W 24/02 370/328 |
| 2014/0192672 | A1* | 7/2014 | Seo | H04L 5/0048 370/252 |
| 2014/0198680 | A1* | 7/2014 | Siomina | H04L 5/14 370/252 |
| 2014/0301337 | A1* | 10/2014 | Hapsari | H04W 76/10 370/329 |
| 2014/0328327 | A1* | 11/2014 | Xiao | H04W 36/30 370/332 |
| 2015/0003271 | A1* | 1/2015 | Park | H04W 24/08 370/252 |
| 2015/0029884 | A1* | 1/2015 | Seo | H04W 36/0088 370/252 |
| 2015/0092768 | A1* | 4/2015 | Ng | H04W 48/16 370/350 |
| 2015/0189574 | A1* | 7/2015 | Ng | H04W 24/08 370/252 |
| 2015/0208263 | A1* | 7/2015 | Behravan | H04L 5/0057 370/252 |
| 2015/0208265 | A1* | 7/2015 | Dalsgaard | H04W 72/12 370/252 |
| 2015/0223149 | A1* | 8/2015 | Liu | H04W 48/12 370/252 |
| 2015/0341877 | A1* | 11/2015 | Yi | H04W 56/001 370/350 |
| 2016/0088500 | A1* | 3/2016 | Chen | H04L 5/0092 370/280 |
| 2016/0149660 | A1* | 5/2016 | Seo | H04W 76/14 370/336 |
| 2016/0277091 | A1* | 9/2016 | Kim | H04B 7/0478 |
| 2017/0013609 | A1* | 1/2017 | Kim | H04L 5/0023 |
| 2017/0078062 | A1* | 3/2017 | Park | H04B 7/26 |
| 2017/0201898 | A1* | 7/2017 | Park | H04W 16/32 |
| 2017/0207845 | A1* | 7/2017 | Moon | H04B 7/088 |
| 2017/0215097 | A1* | 7/2017 | Park | H04B 17/318 |
| 2017/0223760 | A1* | 8/2017 | Adachi | H04W 24/10 |
| 2018/0034525 | A1* | 2/2018 | Park | H04L 5/00 |
| 2018/0192432 | A1* | 7/2018 | Tenny | H04W 16/28 |
| 2018/0242172 | A1* | 8/2018 | Kim | H04L 5/0057 |
| 2018/0262313 | A1* | 9/2018 | Nam | H04L 5/0053 |
| 2018/0359790 | A1* | 12/2018 | Ingale | H04W 8/24 |
| 2020/0059810 | A1* | 2/2020 | Harada | H04W 56/0015 |
| 2020/0305038 | A1* | 9/2020 | Tooher | H04W 36/0069 |

FOREIGN PATENT DOCUMENTS

| | | |
|---|---|---|
| EP | 2827636 A1 | 1/2015 |
| WO | 2014079025 A1 | 5/2014 |
| WO | WO-2016021642 A1 | 2/2016 |
| WO | 2017022902 A1 | 2/2017 |
| WO | 2018075985 A1 | 4/2018 |

OTHER PUBLICATIONS

Intel: "WF on CSI-RS Configuration for L3 Mobility", 3GPP Draft; R1-1706813 WF on CSI-RS for L3 Mobility, 3rd Generation Partnership Project (3GPP), Mobile Competence Centre, 650, Route Des Lucioles, F-06921 Sophia-Antipolis Cedex, France, vol. RAN WG1, No. Spokane, USA; Apr. 3, 2017-Apr. 7, 2017, Apr. 9, 2017 (Apr. 9, 2017), 4 Pages, XP051253021, Retrieved from the Internet: URL: http://www.3gpp.org/ftp/tsg_ran/WG1_RL1/TSGR1_88b/Docs/ [retrieved on Apr. 9, 2017].

International Search Report and Written Opinion—PCT/US2018/031186—ISA/EPO—dated Jul. 6, 2018.

Nokia, et al., "CSI-RS Configuration for L3 Mobility Purposes", 3GPP Draft; R1-1711392, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017, Jun. 16, 2017 (Jun. 16, 2017), 8 Pages, XP051304471, Retrieved from the Internet: URL: http://www.3gpp.org/ftp/tsg_ran/WG1_RL1/TSGR1_AH/NR_AH_1706/Docs/ [retrieved on Jun. 16, 2017].

Qualcomm Incorporated: "Measurement Based on CSI-RS for L3 Mobility Consideration", 3GPP Draft; R1-1708577 Measurement based on CSI-RS for L3 Mobility Consideration, 3rd Generation Partnership Project (3GPP), Mobile Competence Centre; 650, Route Des Lucioles; F-06921 Sophia-Antipol, vol. RAN WG1, No. Hangzhou, China; May 15, 2017-May 19, 2017, May 7, 2017 (May 7, 2017), pp. 1-2, XP051263219, Retrieved from the Internet: URL: http://www.3gpp.org/ftp/tsg_ran/WG1_RL1/TSGR1_89/Docs/ [retrieved on May 7, 2017].

ZTE: "Discussion on the Measurement Report", 3GPP Draft; R2-1704643 Discussion on The Measurement Report, 3rd Generation Partnership Project (3GPP), Mobile Competence Centre; 650, Route Des Lucioles; F-06921 Sophia-Antipolis Cedex; France, vol. RAN WG2, No. Hangzhou, China; May 15, 2017-May 19, 2017, May 5, 2017 (May 5, 2017), 4 Pages, XP051263834, Retrieved from the Internet: URL: http://www.3gpp.org/ftp/tsg_ran/WG2_RL2/TSGR2_98/Docs/ [retrieved on May 5, 2017].

ZTE, et al., "Mobility Procedure", 3GPP Draft; R1-1704367, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017, Mar. 25, 2017 (Mar. 25, 2017), 4 Pages, XP051251169, Retrieved from the Internet: URL: http://www.3gpp.org/ftp/tsg_ran/WG1_RL1/TSGR1_88b/Docs/ [retrieved on Mar. 25, 2017].

Taiwan Search Report—TW107115239—TIPO—dated Aug. 26, 2021.

ZTE, et al., "Mobility Procedure", 3GPP TSG RAN WG1 Meeting #88bis, R1-1704367, ZTE Microelectronics, Spokane, USA, Apr. 3, 2017-Apr. 7, 2017, 4 Pages, Apr. 7, 2017.

Samsung:"RRM Measurement for Multiple Numerologies in NR", 3GPP TSG-RAN WG2 NR #98 Meeting, R2-1704509, Hangzhou, China, May 15-19, 2017, 7 Pages.

\* cited by examiner

REFERENCE SIGNAL ACQUISITION

CROSS-REFERENCE TO RELATED APPLICATION(S)

This application claims priority to and the benefit of provisional patent application No. 62/502,353 filed in the U.S. Patent and Trademark Office on May 5, 2017, the entire content of which is incorporated herein by reference.

INTRODUCTION

Various aspects described herein relate to wireless communication and more particularly, but not exclusively, to acquiring reference signals.

Wireless communication networks are widely deployed to provide various communication services such as telephony, video, data, messaging, broadcasts, and so on. Such networks, which are usually multiple access networks, support communication for multiple users by sharing the available network resources.

In some wireless communication networks, cell-specific reference signals (CRSs) may be used to make mobility decisions (e.g., whether to handover to another cell). However, the use of CRSs may be inefficient or CRSs might not be available in some networks. Thus, there is a need for effective mobility techniques in wireless communication networks.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In some aspects, the disclosure provides a method of communication. The method including: identifying a cell that provides timing for a channel state information-reference signal (CSI-RS); and sending an indication of the identified cell to a user equipment (UE).

In some aspects, the disclosure provides an apparatus for communication, including: a memory device and a processing circuit coupled to the memory. The processing circuit is configured to: identify a cell that provides timing for a channel state information-reference signal (CSI-RS); and send an indication of the identified cell to a user equipment (UE).

In some aspects, the disclosure provides an apparatus configured for communication. The apparatus including: means for identifying a cell that provides timing for a channel state information-reference signal (CSI-RS); and means for sending an indication of the identified cell to a user equipment (UE).

In some aspects, the disclosure provides a non-transitory computer-readable medium storing computer-executable code, including code to: identify a cell that provides timing for a channel state information-reference signal (CSI-RS); and send an indication of the identified cell to a user equipment (UE).

In some aspects, the disclosure provides a method of communication. The method including: receiving an indication of a cell that provides timing for receiving a channel state information-reference signal (CSI-RS) at a user equipment (UE); and receiving the CSI-RS.

In some aspects, the disclosure provides an apparatus for communication, including: a memory device and a processing circuit coupled to the memory. The processing circuit is configured to: receive an indication of a cell that provides timing for receiving a channel state information-reference signal (CSI-RS) at a user equipment (UE); and receive the CSI-RS.

In some aspects, the disclosure provides an apparatus configured for communication. The apparatus including: means for receiving an indication of a cell that provides timing for receiving a channel state information-reference signal (CSI-RS) at a user equipment (UE); and means for receiving the CSI-RS.

In some aspects, the disclosure provides a non-transitory computer-readable medium storing computer-executable code, including code to: receive an indication of a cell that provides timing for receiving a channel state information-reference signal (CSI-RS) at a user equipment (UE); and receive the CSI-RS.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
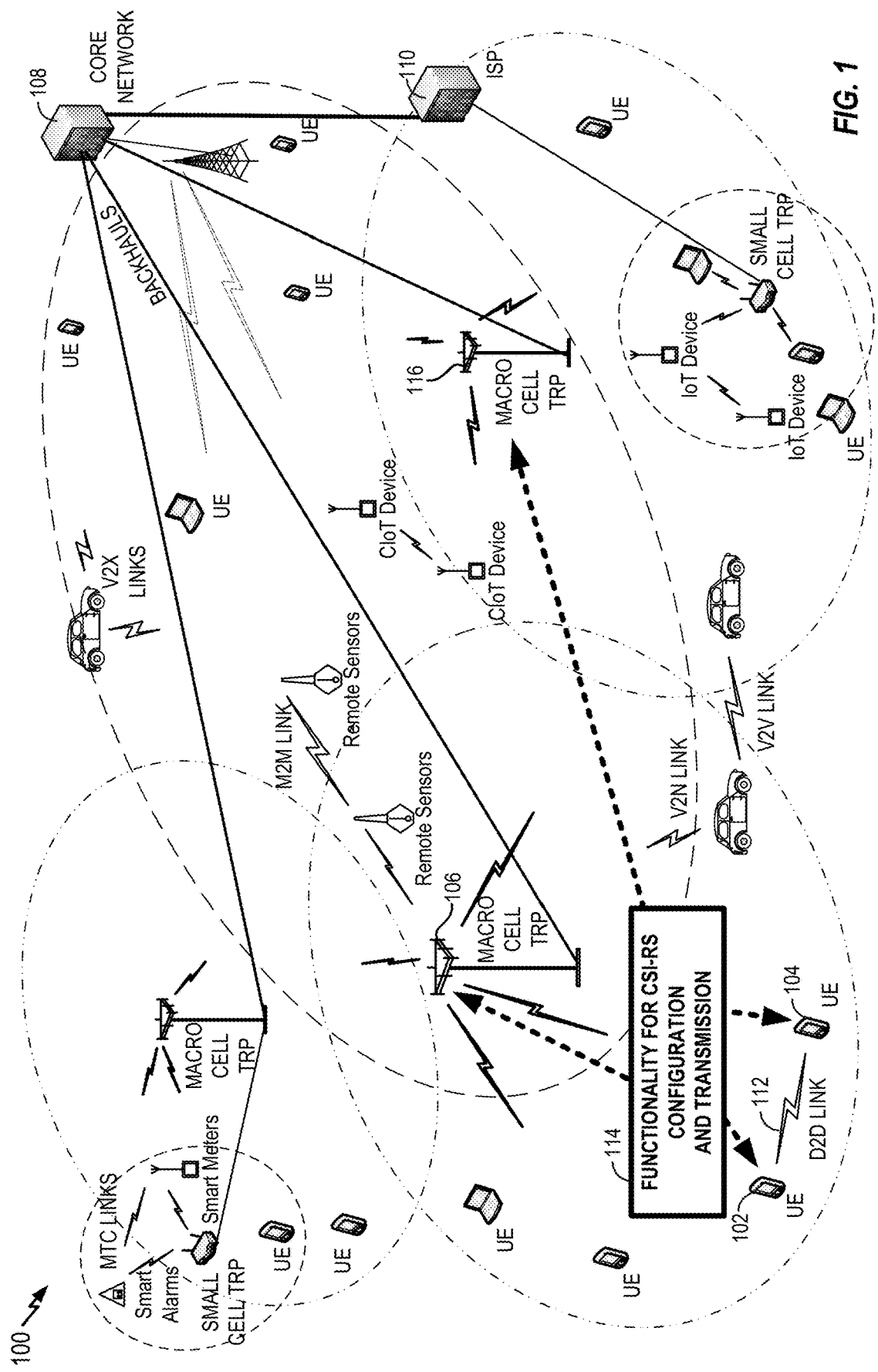
FIG. 1 is a diagram of an example communication system in which aspects of the disclosure may be used.

Various aspects of the disclosure relate to the acquisition of reference signals. In some aspects, a network may send an indication to a user equipment (UE) that tells the UE which cell timing (e.g., serving cell timing or neighbor cell timing) to use for receiving a CSI-RS. Cell timing may be determined, for example, based on timing of the synchronization signal blocks (SS-blocks) transmitted in the cell. In some aspects, a network may request a UE to measure a timing difference between neighbor cells and use that information to generate a CSI-RS configuration. The network sends the CSI-RS configuration to the UE to enable the UE to acquire a CSI-RS from a neighbor cell. In some aspects, a network may send timing-related information to a neighbor cell and the neighbor cell uses that information to transmit a CSI-RS.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. Moreover, alternate configurations may be devised without departing from the scope of the disclosure. Additionally, well-known elements will not be described in detail or will be omitted so as not to obscure the relevant details of the disclosure.

The various concepts presented throughout this disclosure may be implemented across a broad variety of telecommunication systems, network architectures, and communication standards. For example, the 3rd Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Thus, the teachings herein can be implemented according to various network technologies including, without limitation, 5G technology, fourth generation (4G) technology, third generation (3G) technology, and other network architectures. Also, the techniques described herein may be used for a downlink, an uplink, a peer-to-peer link, or some other type of link.

The actual telecommunication standard, network architecture, and/or communication standard used will depend on the specific application and the overall design constraints imposed on the system. For purposes of illustration, the following may describe various aspects in the context of a 5G system and/or an LTE system. It should be appreciated, however, that the teachings herein may be used in other systems as well. Thus, references to functionality in the context of 5G and/or LTE terminology should be understood to be equally applicable to other types of technology, networks, components, signaling, and so on.

Example Communication System

FIG. 1 illustrates an example of a wireless communication system 100 where a user equipment (UE) can communicate with other devices via wireless communication signaling. For example, a first UE 102 and a second UE 104 may communicate with a first transmit receive point (TRP) 106 using wireless communication resources managed by the first TRP 106 and/or other network components (e.g., a core network 108, an internet service provider (ISP) 110, peer devices, and so on). In addition, devices in the system 100 may communicate with each other directedly via a device-to-device (D2D) link 112 or other similar links.

In accordance with the teachings herein, devices in the wireless communication system 100 may include functionality for CSI-RS configuration and transmission 114. For example, each of the first UE 102, the second UE 104, the first TRP 106, and a second TRP 116 may include functionality for CSI-RS configuration and transmission 114 as discussed in more detail below.

The components and links of the wireless communication system 100 may take different forms in different implementations. For example, and without limitation, UEs may be cellular devices, Internet of Things (IoT) devices, cellular IoT (CIoT) devices, LTE wireless cellular devices, machine-type communication (MTC) cellular devices, smart alarms, remote sensors, smart phones, mobile phones, smart meters, personal digital assistants (PDAs), personal computers, mesh nodes, and tablet computers.

In some aspects, a TRP may refer to a physical entity that incorporates radio head functionality for a particular physical cell. In some aspects, the TRP may include 5G new radio (NR) functionality with an air interface based on orthogonal frequency division multiplexing (OFDM). NR may support, for example and without limitation, enhanced mobile broadband (eMBB), mission-critical services, and wide-scale deployment of IoT devices. The functionality of a TRP may be similar in one or more aspects to (or incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity. In different scenarios (e.g., NR, LTE, etc.), a TRP may be referred to as a gNodeB (gNB), an eNB, a base station, or referenced using other terminology.

Various types of network-to-device links and D2D links may be supported in the wireless communication system 100. For example, D2D links may include, without limitation, machine-to-machine (M2M) links, MTC links, vehicle-to-vehicle (V2V) links, and vehicle-to-anything (V2X) links. Network-to-device links may include, without limitation, uplinks (or reverse links), downlinks (or forward links), and vehicle-to-network (V2N) links.

Example Communication Components

Figure 2:
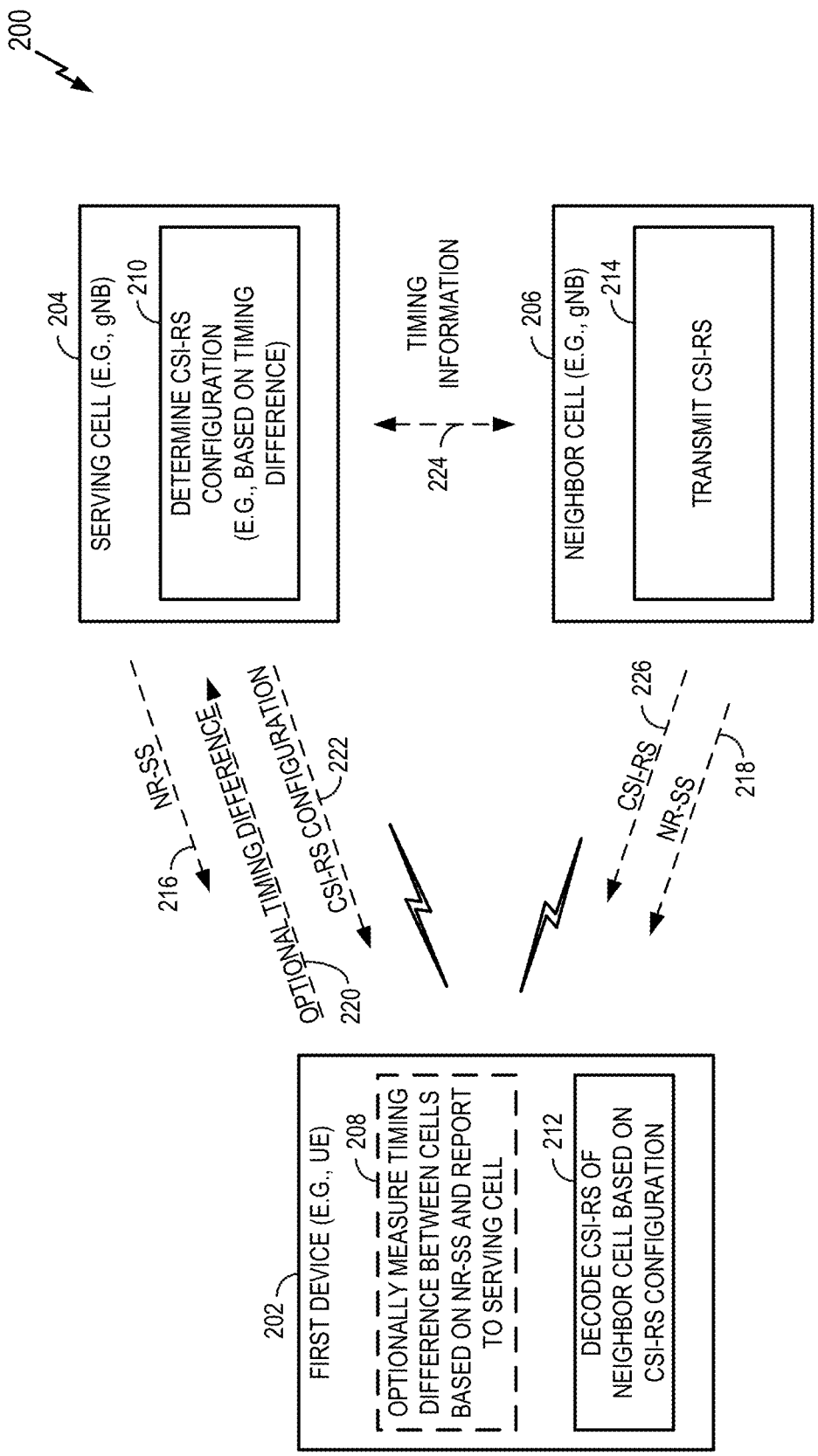
FIG. 2 is a block diagram of another example communication system in which aspects of the disclosure may be used.

FIG. 2 illustrates another example of a wireless communication system 200 where a first device (e.g., a UE) 202 may receive signals from different cells. For example, the first device 202 may currently receive service from a serving cell 204 (e.g., a cell of a gNB), yet repeatedly conduct measurements of nearby cells such as a neighbor cell 206 (e.g., a cell of another gNB). To reduce the complexity of FIG. 2, only three entities are shown. In practice, a wireless communication system may include more of these entities.

In accordance with the teachings herein, the first device 202 may decode a CSI-RS from the neighbor cell 206 with assistance from the serving cell 204. To this end, the first device 202 may optionally include functionality 208 to measure a timing difference (e.g., a symbol timing difference or some other timing difference) between cells based on NR synchronization signals (NR-SSs) and to report the timing difference to the serving cell 204. For example, the first device 202 may measure a symbol timing difference (or some other timing difference) between the serving cell 204 and the neighbor cell 206 based on an NR-SS 216 received from the serving cell 204 and an NR-SS 218 received from the neighbor cell 206. The first device 202 may therefore optionally send an indication of the timing difference 220 to the serving cell 204.

The serving cell 204 includes functionality 210 to determine a CSI-RS configuration. In some scenarios, the CSI-RS configuration may indicate which cell the first device 202 may use as a timing reference for receiving a CSI-RS (e.g., for receiving a CSI-RS from the neighbor cell 206). For example, the CSI-RS-configuration may indicate that the first device 202 may base the timing of the CSI-RS on the timing of the serving cell 204. As another example, the CSI-RS-configuration may indicate that the first device 202 may base the timing of the CSI-RS on the timing of the neighbor cell 206. As discussed herein, the serving cell 204 sends the CSI-RS configuration 222 to the first device 202.

In some scenarios, the determination of the CSI-RS configuration is based on a symbol timing difference (or some other timing difference) between the serving cell 204 and the neighbor cell 206. In some implementations, this determination may be based on the timing difference 220 sent by the first device 202. In some implementations, this determination may be based on timing information the serving cell receives from and/or sends to the neighbor cell. Thus, the serving cell 204 may send and/or receive timing information 224 (e.g., CSI-RS timing information) to and/or from the neighbor cell 206.

The neighbor cell 206 includes functionality 214 to transmit a CSI-RS. The CSI-RS may be transmitted based on the timing of the neighbor cell 206 and/or based on CSI-RS timing information received from the serving cell 204 or some other entity. For example, the CSI-RS timing information may indicate when the neighbor cell 206 is to transmit the CSI-RS 226.

The first device 202 also includes functionality 212 to decode the CSI-RS 226 of the neighbor cell 206. In some aspects, this decoding may be based on the CSI-RS configuration 222 received from the serving cell 204. Other devices of the wireless communication system 200 may include functionality (not shown) similar to that discussed above.

CSI-RS Configuration and Transmission

For cell level mobility in Radio Resource Control (RRC) CONNECTED mode, a CSI-RS can be used, in addition to an IDLE mode reference signal RS (e.g., a NR-SS). The detection of a neighbor cell for measurement is based on NR-SS.

For RRC CONNECTED mode mobility involving a CSI-RS, a UE uses a CSI-RS configuration for measuring CSI-RS transmissions from neighbor cells. The CSI-RS configuration may include, for example antenna ports, CSI-RS reference signal configuration, CSI-RS subframe configuration, and CSI-RS scrambling identity. These parameters may be a function of neighbor cell timing, which includes one or more of a system frame number, a sub-frame index, a slot index, a mini slot index, or a symbol index. The timing information may be conveyed in a physical broadcast channel (PBCH) of each neighbor cell.

A UE in CONNECTED mode might be configured to not decode PBCH from neighbor cells. For example, decoding of PBCH may be avoided to reduce operational complexity during CONNECTED measurements. Consequently, a UE might not be able to measure CSI-RS transmissions from neighbor cells.

The disclosure relates in some aspects to enabling a UE to decode the CSI-RS of a neighbor cell without requiring the UE to read the neighbor cell's PBCH. For example, the network may assist the UE in obtaining the timing (or relative timing) and/or scrambling information of the target cell. To this end, the network (e.g., the current serving cell) may perform one of more of the following operations.

In some aspects, the network may configure one or more UEs to measure a symbol timing difference (or some other timing difference) between a serving cell and one or more neighbor cell(s). In some scenarios, a UE may autonomously elect to conduct such a measurement.

The network (e.g., a cell in the network) may thus obtain a timing difference from one or more UEs. Alternatively, or in addition, the network may determine the timing difference based on timing information the network receives from one or more cells. From this timing difference or these timing differences, the network derives an estimate of the timing difference between the serving cell and the neighbor cell(s).

The network may use the timing difference(s) between the serving and neighbor cells for CSI-RS configuration and transmission. For example, the network may generate a CSI-RS configuration of one or more neighbor cells based on the timing difference(s) and send the CSI-RS configuration to a UE.

The CSI-RS configuration may include antenna ports, a CSI-RS reference signal configuration, a CSI-RS sub-frame configuration, and other information. The network may indicate to the UE that the timing for a CSI-RS is based on timing of the serving cell or the neighbor cell. The network may provide a subset of system frame number (SFN), subframe index (SFI), symbol index (SI) and/or a difference in timing (e.g., symbol timing) between the serving cell and the neighbor cell(s) to the UE. The scrambling ID or the seed for obtaining the scrambling ID can be provided as part of the CSI-RS configuration. The network may also specify if (1) the same scrambling sequence is sent or (2) different scrambling sequences are sent over symbols during the symbol timing difference estimate between the serving and neighbor cell(s).

The network (e.g., the current serving cell, or a network node such as a Mobility Management Entity (MME), a gateway, etc.) may also control transmission of CSI-RS from a neighbor cell. In one scenario, the network may instruct the neighbor cell(s) to transmit CSI-RS based on the neighbor cell's timing.

In another scenario, the network may instruct the neighbor cell(s) to transmit CSI-RS based on the serving cell's timing, in which case the following operations may be supported. The network may provide to the neighbor cell(s) a subset of SFN, SFI, SI and an estimate of symbol timing difference between the serving and the neighbor cell(s). The network may also specify if the same scrambling sequence is sent or different scrambling sequences are sent over symbols during the symbol timing difference between serving and neighbor cell. The network may also coordinate the transmission of CSI-RS from one or more cells (e.g., by specifying an offset between the transmission of CSI-RS by different cells).

If configured by the network, a UE may measure the timing difference between a serving cell and one or more neighbor cells. In addition, if configured by the network, the UE may report the symbol difference to the network.

Example Operations

Figure 3:
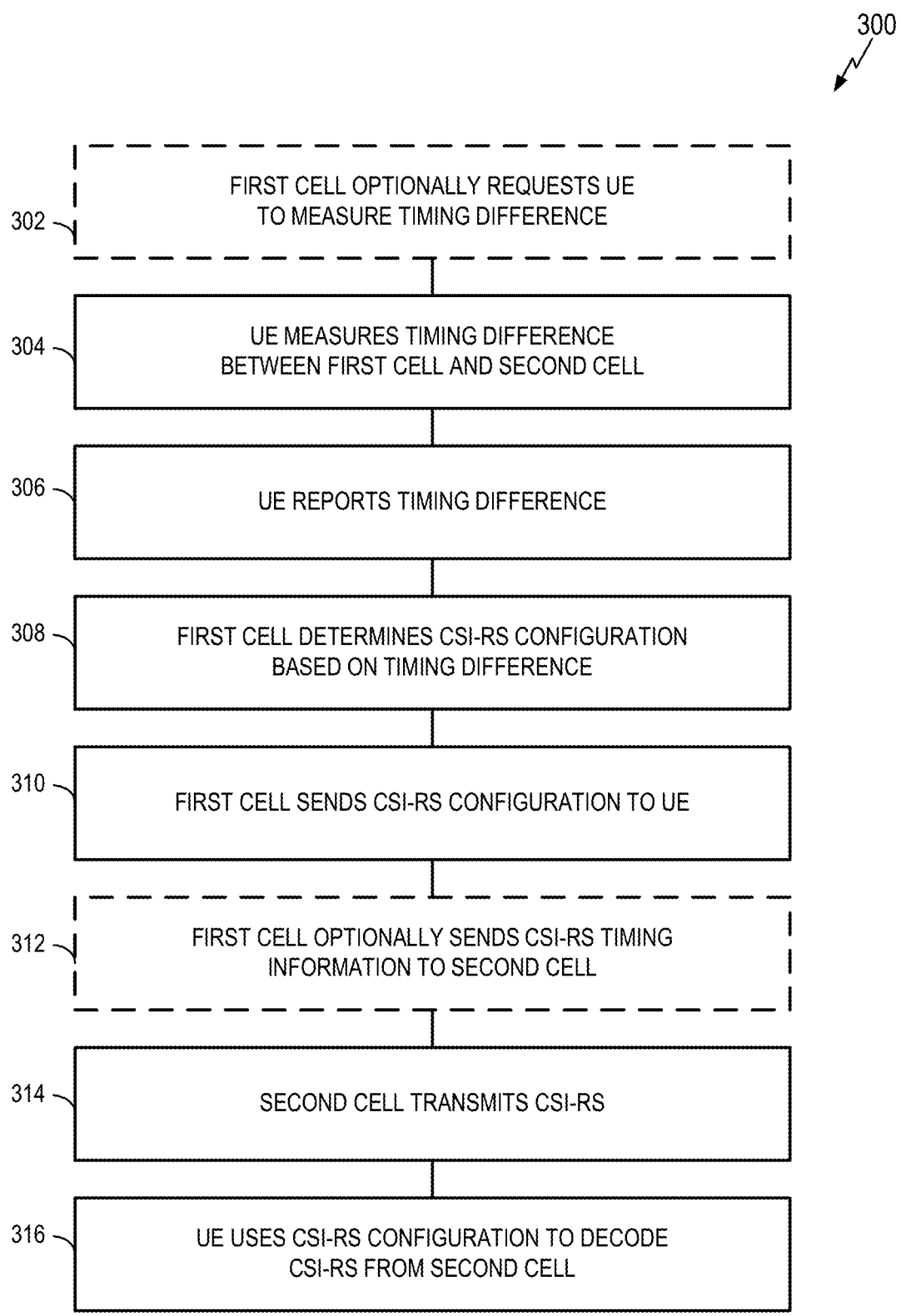
FIG. 3 is a diagram illustrating an example process for providing and using a CSI-RS configuration in accordance with some aspects of the disclosure.

With the above in mind, FIG. 3 illustrates a process 300 for communication in accordance with some aspects of the disclosure. The process 300 may be collectively performed by, for example, one or more of: at least one UE, at least one gNB, at least one access terminal, at least one TRP, at least one base station, and so on. Of course, in various aspects within the scope of the disclosure, the process 300 may be implemented by any suitable apparatuses capable of supporting communication-related operations (e.g., RS-related operations).

At optional block 302, a first cell (e.g., a first gNB) may request a UE to measure a timing difference between the first cell and a second cell (e.g., a second gNB). For example, the first cell may be a serving cell for the UE and the second cell may be a neighbor cell (e.g., a potential target cell for handover).

At block 304, the UE measures the timing difference between the first cell and the second cell. As discussed herein, this measurement may be based on NR-SSs transmitted by the first cell and the second cell.

At block 306, the UE reports the timing difference to the first cell.

At block 308, the first cell determines the CSI-RS configuration based on the timing difference.

At block 310, the first cell sends the CSI-RS configuration to the UE.

At optional block 312, the first cell may send CSI-RS timing information to the second cell. This information may be sent, for example, via direct communication between the two cells (for example, via an interface such as the X2 interface in LTE), or via other intermediate network nodes such as an MME, a gateway, etc.

At block 314, the second cell transmits CSI-RS. As discussed herein, this transmission of CSI-RS may be based, at least in some cases, on the CSI-RS timing information received from the first cell.

At block 316, the UE uses the CSI-RS configuration to decode the CSI-RS from the second cell. For example, the UE may determine which sequence is used by the second cell in the transmission of the CSR-RS based on a scrambling ID, a seed used to generate the scrambling ID, or a symbol index used to generate the seed. Advantageously, at this step, the UE may use the timing of the first cell (e.g., the serving cell) instead of the timing of the second cell (which could require reading the PBCH of the second cell to acquire the timing of the second cell).

Figure 4:
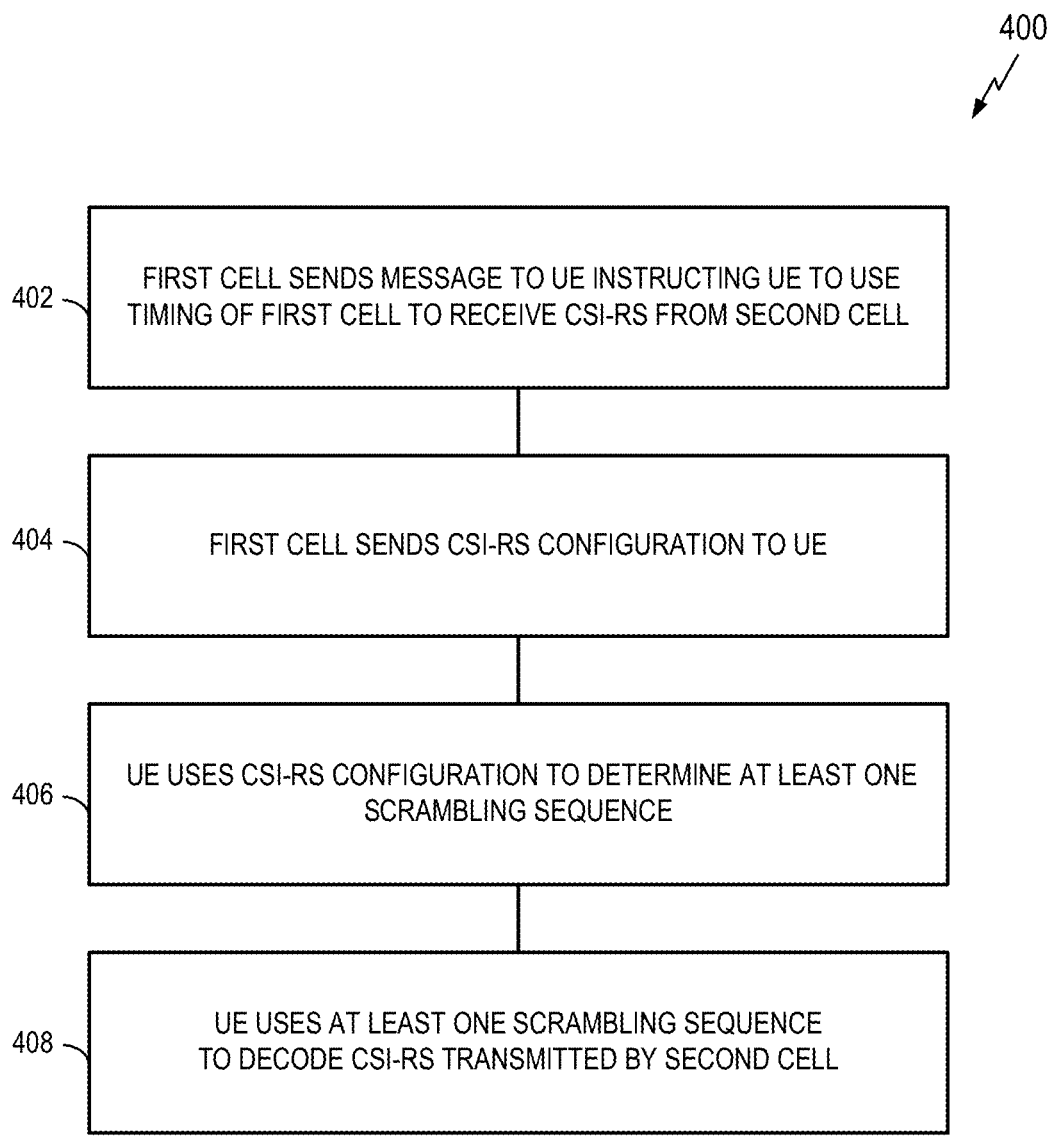
FIG. 4 is a diagram illustrating an example process for using timing of a first cell to receive CSI-RS from a second cell in accordance with some aspects of the disclosure.

FIG. 4 illustrates another process 400 for communication in accordance with some aspects of the disclosure. The process 400 may be collectively performed by, for example, one or more of: at least one UE, at least one gNB, at least one access terminal, at least one TRP, at least one base station, and so on. Of course, in various aspects within the scope of the disclosure, the process 400 may be implemented by any suitable apparatuses capable of supporting communication-related operations (e.g., RS-related operations).

At block 402, a first cell (e.g. a first gNB) sends a message to a UE instructing the UE to use the timing of the first cell to receive a CSI-RS from a second cell (e.g., a second gNB).

At block 404, the first cell sends a CSI-RS configuration to the UE. In some aspects, the CSI-RS configuration may be based on timing of the second cell (e.g., based on a timing difference between the first cell and the second cell).

At block 406, the UE uses the CSI-RS configuration to determine at least one scrambling sequence.

At block 408, the UE uses the at least one scrambling sequence to decode a CSI-RS transmitted by the second cell.

Figure 5:
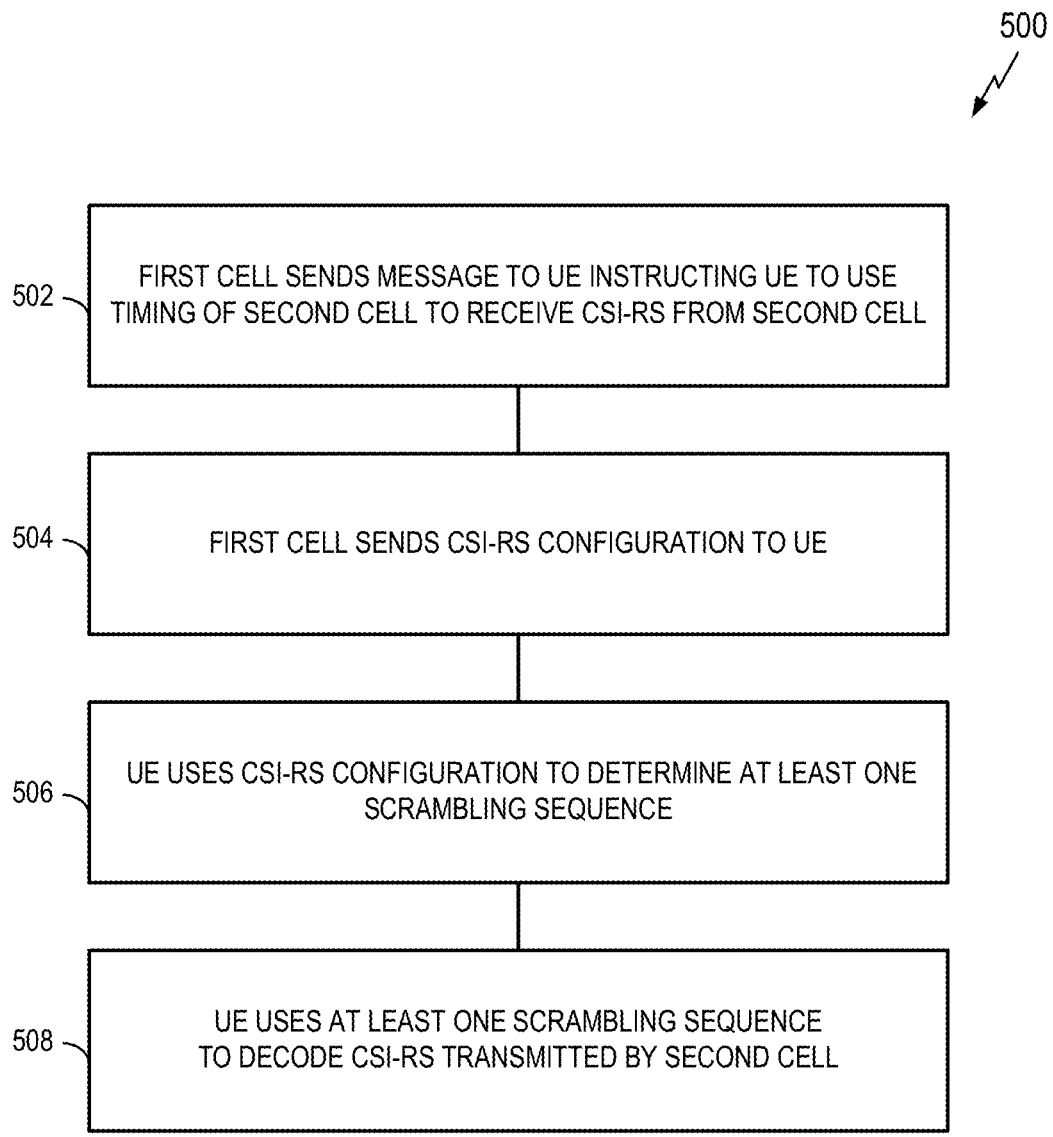
FIG. 5 is a diagram illustrating an example process for using timing of a second cell to receive CSI-RS from a second cell in accordance with some aspects of the disclosure.

FIG. 5 illustrates another process 500 for communication in accordance with some aspects of the disclosure. The process 500 may be collectively performed by, for example, one or more of: at least one UE, at least one gNB, at least one access terminal, at least one TRP, at least one base station, and so on. Of course, in various aspects within the scope of the disclosure, the process 500 may be implemented by any suitable apparatuses capable of supporting communication-related operations (e.g., RS-related operations).

At block 502, a first cell (e.g. a first gNB) sends a message to a UE instructing the UE to use the timing of a second cell (e.g. a second gNB) to receive a CSI-RS from the second cell.

At block 504, the first cell sends a CSI-RS configuration to a UE. In some aspects, the CSI-RS configuration may be based on timing of the second cell (e.g., the configuration may include timing information for the second cell).

At block 506, the UE uses the CSI-RS configuration to determine at least one scrambling sequence.

At block 508, the UE uses the at least one scrambling sequence to decode a CSI-RS transmitted by the second cell.

Figure 6:
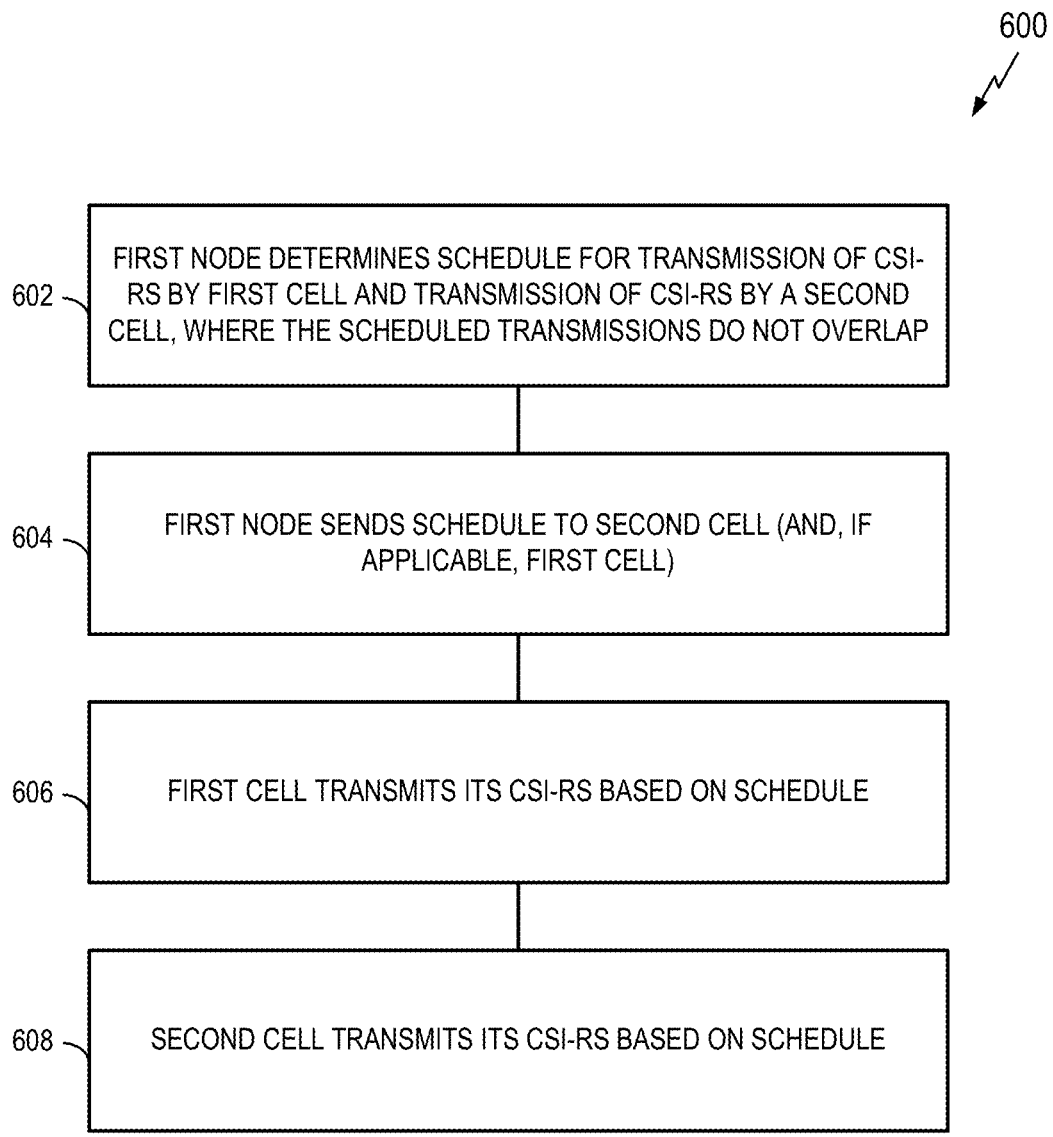
FIG. 6 is a diagram illustrating an example process for scheduling CSI-RS transmissions by different cells in accordance with some aspects of the disclosure.

FIG. 6 illustrates another process 600 for communication in accordance with some aspects of the disclosure. The process 600 may be collectively performed by, for example, one or more of: at least one network node, at least one gNB, at least one TRP, at least one base station, and so on. Of course, in various aspects within the scope of the disclosure, the process 600 may be implemented by any suitable apparatuses capable of supporting communication-related operations (e.g., RS-related operations).

At block 602, a first node (e.g. a network node or a first gNB) determines a schedule for transmission of CSI-RS by a first cell and transmission of CSI-RS by a second cell, where the scheduled transmissions do not overlap.

At block 604, the first node sends the schedule to the second cell (and, if applicable, the first cell), At block 606, the first cell transmits its CSI-RS based on the schedule.

At block 608, the second cell transmits its CSI-RS based on the schedule.

Example Beamformed Operation

The teachings herein may be used in a network that uses beamforming. For example, a gNB may communicates with a first UE and a second UE via different beamforming directions. That is, the gNB may communicate via any one of a first plurality of directional beams, the first UE 304 may communicate via any one of a plurality of second directional beams, and the second UE may communicate via any one of a plurality of directional beams. Thus, the gNB may communicate with the first UE via a first beamforming direction and communicate with the second UE via a second beamforming direction.

A wireless multiple-input multiple-output (MIMO) system may use multiple transmit antennas to provide beamforming-based signal transmission. Typically, beamforming-based signals transmitted from different antennas are adjusted in phase (and optionally amplitude) such that the resulting signal power is focused toward a receiver device (e.g., a UE).

A wireless MIMO system may support communication for a single user at a time or for several users concurrently. Transmissions to a single user (e.g., a single receiver device) are commonly referred to as single-user MIMO (SU-MIMO), while concurrent transmissions to multiple users are commonly referred to as multi-user MIMO (MU-MIMO).

A gNB of a MIMO system employs multiple antennas for data transmission and reception, while each UE employs one or more antennas. The gNB communicates with the UEs via forward link channels and reverse link channels. In some aspects, a downlink (DL) channel refers to a communication channel from a transmit antenna of the access point to a receive antenna of a UE, and an uplink (UL) channel refers to a communication channel from a transmit antenna of a UE to a receive antenna of the gNB. Downlink and uplink may be referred to as forward link and reverse link, respectively.

MIMO channels corresponding to transmissions from a set of transmit antennas to a receive antenna are referred to spatial streams since precoding (e.g., beamforming) is employed to direct the transmissions toward the receive antenna. Consequently, in some aspects each spatial stream corresponds to at least one dimension. A MIMO system thus provides improved performance (e.g., higher throughput and/or greater reliability) through the use of the additional dimensionalities provided by these spatial streams.

First Example Apparatus

Figure 7:
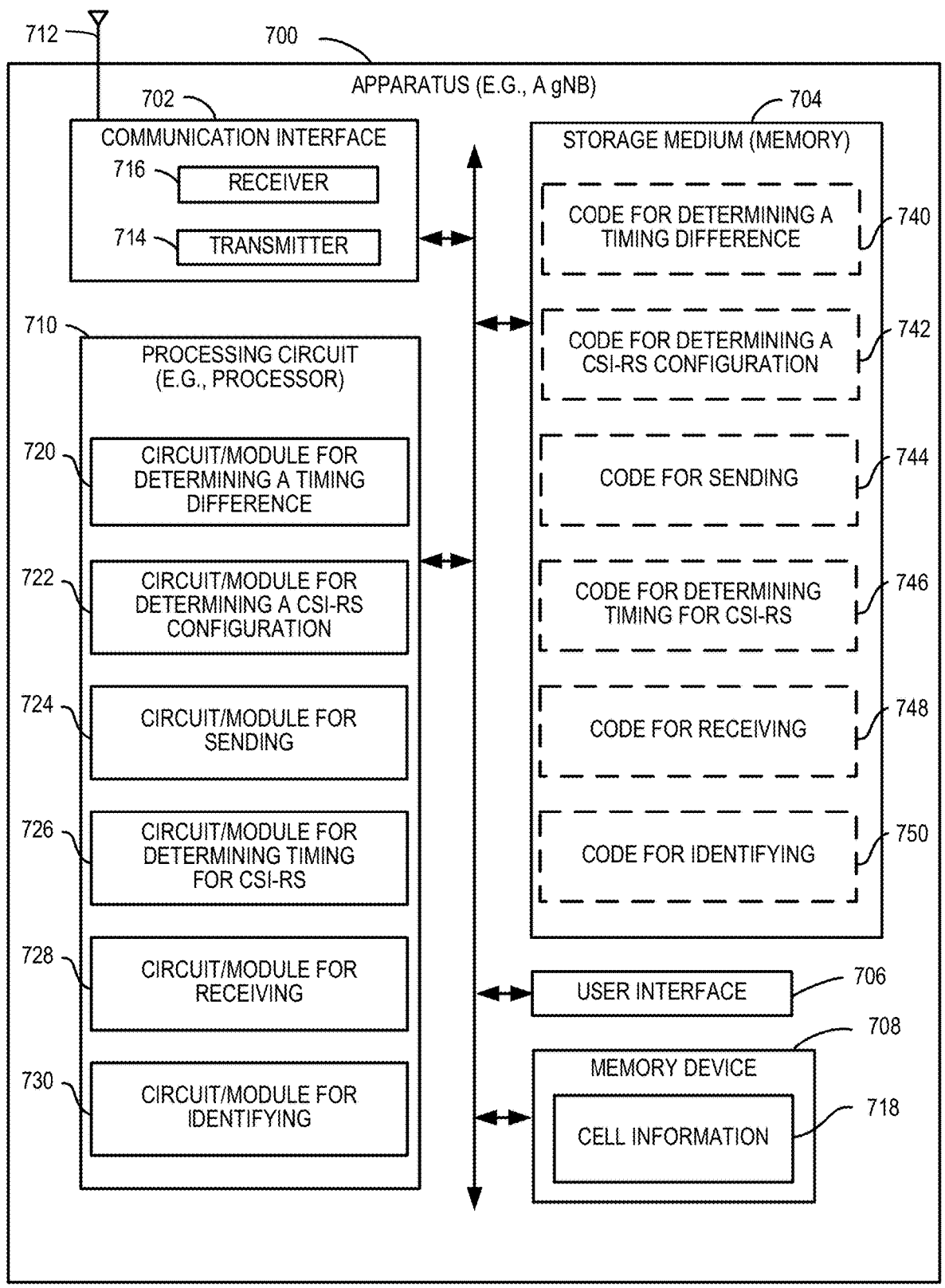
FIG. 7 is a block diagram illustrating an example hardware implementation for an apparatus (e.g., an electronic device) that can support communication in accordance with some aspects of the disclosure.

FIG. 7 illustrates a block diagram of an example hardware implementation of an apparatus 700 configured to communicate according to one or more aspects of the disclosure. The apparatus 700 could embody or be implemented within a gNB, a transmit receive point (TRP), an access point, a UE, or some other type of device that supports reference signals as taught herein. In various implementations, the apparatus 700 could embody or be implemented within a base station, an access terminal, or some other type of device. In various implementations, the apparatus 700 could embody or be implemented within a server, a network entity, a mobile phone, a smart phone, a tablet, a portable computer, a personal computer, a sensor, an alarm, a vehicle, a machine, an entertainment device, a medical device, or any other electronic device having circuitry.

The apparatus 700 includes a communication interface 702 (e.g., at least one transceiver), a storage medium 704, a user interface 706, a memory device 708, and a processing circuit 710 (e.g., at least one processor). These components can be coupled to and/or placed in electrical communication with one another via a signaling bus or other suitable component, represented generally by the connection lines in FIG. 7. The signaling bus may include any number of interconnecting buses and bridges depending on the specific application of the processing circuit 710 and the overall design constraints. The signaling bus links together various circuits such that each of the communication interface 702, the storage medium 704, the user interface 706, and the memory device 708 are coupled to and/or in electrical communication with the processing circuit 710. The signaling bus may also link various other circuits (not shown) such as timing sources, peripherals, voltage regulators, and power management circuits, which are well known in the art, and therefore, will not be described any further.

The communication interface 702 may be adapted to facilitate wireless communication of the apparatus 700. For example, the communication interface 702 may include circuitry and/or programming adapted to facilitate the communication of information bi-directionally with respect to one or more communication devices in a network. Thus, in some implementations, the communication interface 702 may be coupled to one or more antennas 712 for wireless communication within a wireless communication system. In some implementations, the communication interface 702 may be configured for wire-based communication. For example, the communication interface 702 could be a bus interface, a send/receive interface, or some other type of signal interface including drivers, buffers, or other circuitry for outputting and/or obtaining signals (e.g., outputting signal from and/or receiving signals into an integrated circuit). The communication interface 702 can be configured with one or more standalone receivers and/or transmitters, as well as one or more transceivers. In the illustrated example, the communication interface 702 includes a transmitter 714 and a receiver 716.

The memory device 708 may represent one or more memory devices. As indicated, the memory device 708 may maintain cell information 718 along with other information used by the apparatus 700. In some implementations, the memory device 708 and the storage medium 704 are implemented as a common memory component. The memory device 708 may also be used for storing data that is manipulated by the processing circuit 710 or some other component of the apparatus 700.

The storage medium 704 may represent one or more computer-readable, machine-readable, and/or processor-readable devices for storing programming, such as processor executable code or instructions (e.g., software, firmware), electronic data, databases, or other digital information. The storage medium 704 may also be used for storing data that is manipulated by the processing circuit 710 when executing programming. The storage medium 704 may be any available media that can be accessed by a general purpose or special purpose processor, including portable or fixed storage devices, optical storage devices, and various other mediums capable of storing, containing or carrying programming.

By way of example and not limitation, the storage medium 704 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 704 may be embodied in an article of manufacture (e.g., a computer program product). By way of example, a computer program product may include a computer-readable medium in packaging materials. In view of the above, in some implementations, the storage medium 704 may be a non-transitory (e.g., tangible) storage medium.

The storage medium 704 may be coupled to the processing circuit 710 such that the processing circuit 710 can read information from, and write information to, the storage medium 704. That is, the storage medium 704 can be coupled to the processing circuit 710 so that the storage medium 704 is at least accessible by the processing circuit 710, including examples where at least one storage medium is integral to the processing circuit 710 and/or examples where at least one storage medium is separate from the processing circuit 710 (e.g., resident in the apparatus 700, external to the apparatus 700, distributed across multiple entities, etc.).

Programming stored by the storage medium 704, when executed by the processing circuit 710, causes the processing circuit 710 to perform one or more of the various functions and/or process operations described herein. For example, the storage medium 704 may include operations configured for regulating operations at one or more hardware blocks of the processing circuit 710, as well as to utilize the communication interface 702 for wireless communication utilizing their respective communication protocols. In some aspects, the storage medium 704 may include a non-transitory computer-readable medium storing computer-executable code, including code to perform the functionality described herein.

The processing circuit 710 is generally adapted for processing, including the execution of such programming stored on the storage medium 704. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 710 is arranged to obtain, process and/or send data, control data access and storage, issue commands, and control other desired operations. The processing circuit 710 may include circuitry configured to implement desired programming provided by appropriate media in at least one example. For example, the processing circuit 710 may be implemented as one or more processors, one or more controllers, and/or other structure configured to execute executable programming Examples of the processing circuit 710 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 710 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 710 are for illustration and other suitable configurations within the scope of the disclosure are also contemplated.

According to one or more aspects of the disclosure, the processing circuit 710 may be adapted to perform any or all of the features, processes, functions, operations and/or routines for any or all of the apparatuses described herein. For example, the processing circuit 710 may be configured to perform any of the steps, functions, and/or processes described with respect to FIGS. 1-6 and 8-10. As used herein, the term "adapted" in relation to the processing circuit 710 may refer to the processing circuit 710 being one or more of configured, used, implemented, and/or programmed to perform a particular process, function, operation and/or routine according to various features described herein.

The processing circuit 710 may be a specialized processor, such as an application specific integrated circuit (ASIC) that serves as a means for (e.g., structure for) carrying out any one of the operations described in conjunction with FIGS. 1-6 and 8-10. The processing circuit 710 may serve as one example of a means for transmitting and/or a means for receiving. In various implementations, the processing circuit 710 may provide and/or incorporate, at least in part, the functionality described above for the serving cell 204 of FIG. 2.

According to at least one example of the apparatus 700, the processing circuit 710 may include one or more of a circuit/module for determining a timing difference 720, a circuit/module for determining a CSI-RS configuration 722, a circuit/module for sending 724, a circuit/module for determining timing for CSI-RS 726, a circuit/module for receiving 728, or a circuit/module for identifying 730. In various implementations, the circuit/module for determining a timing difference 720, the circuit/module for determining a CSI-RS configuration 722, the circuit/module for sending 724, the circuit/module for determining timing for CSI-RS 726, the circuit/module for receiving 728, or the circuit/module for identifying 730 may provide and/or incorporate, at least in part, the functionality described above for the serving cell 204 of FIG. 2.

As mentioned above, programming stored by the storage medium 704, when executed by the processing circuit 710, causes the processing circuit 710 to perform one or more of the various functions and/or process operations described herein. For example, the programming may cause the processing circuit 710 to perform the various functions, steps, and/or processes described herein with respect to FIGS. 1-6 and 8-10 in various implementations. As shown in FIG. 7, the storage medium 704 may include one or more of code for determining a timing difference 740, code for determining a CSI-RS configuration 742, code for sending 744, code for determining timing for CSI-RS 746, code for receiving 748, or code for identifying 750. In various implementations, the code for determining a timing difference 740, the code for determining a CSI-RS configuration 742, the code for sending 744, the code for determining timing for CSI-RS 746, the code for receiving 748, or the code for identifying 750 may be executed or otherwise used to provide the functionality described herein for the circuit/module for determining a timing difference 720, the circuit/module for determining a CSI-RS configuration 722, the circuit/module for sending 724, the circuit/module for determining timing for CSI-RS 726, the circuit/module for receiving 728, or the circuit/module for identifying 730.

First Example Process

Figure 8:
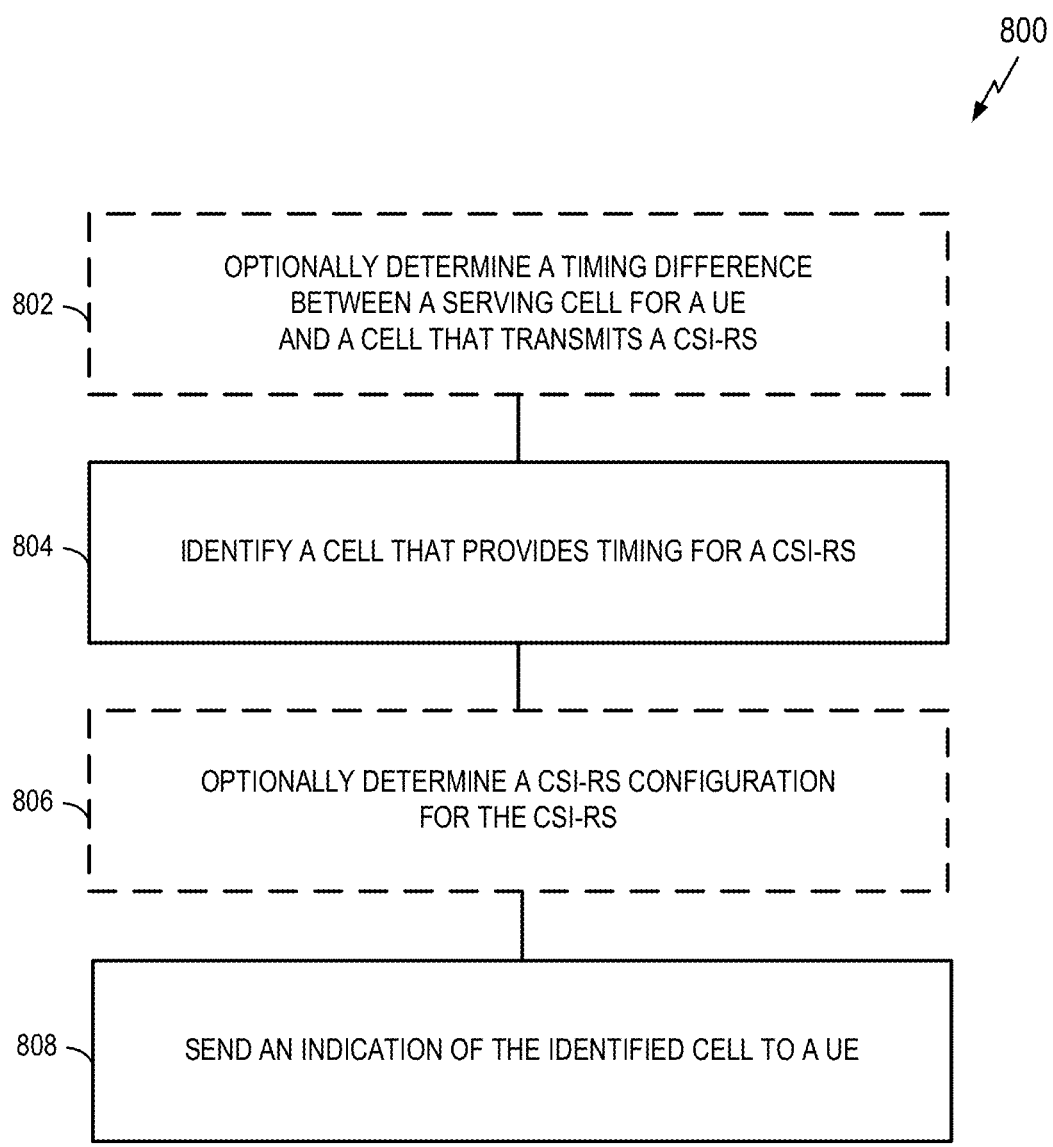
FIG. 8 is a flowchart illustrating an example of a process for providing an indication of CSI-RS timing in accordance with some aspects of the disclosure.

FIG. 8 illustrates a process 800 for communication in accordance with some aspects of the disclosure. The process 800 may take place within a processing circuit (e.g., the processing circuit 710 of FIG. 7), which may be located in a gNB, a TRP, a base station, a UE, an access terminal, or some other suitable apparatus. Of course, in various aspects within the scope of the disclosure, the process 800 may be implemented by any suitable apparatus capable of supporting communication-related operations (e.g., sidelink operations).

At optional block 802, an apparatus (e.g., a gNB) may determine a timing difference between a serving cell for a UE and a cell that transmits a CSI-RS (e.g., a neighbor cell). In this case, the determination of the CSI-RS configuration at block 806 may be based on the timing difference. In some aspects, the timing difference may include a symbol timing difference. In some aspects, the timing difference may include a slot timing difference, a mini-slot timing difference, a system frame number timing difference, or any combination thereof.

In some aspects, the determination of the timing difference may include receiving an indication of the timing difference from the UE. In some aspects, the process 800 may further include sending a request to measure the timing difference to the UE.

In some aspects, the determination of the timing difference may include: receiving a first indication of the timing difference from the UE and at least one second indication of the timing difference from at least one other UE, and generating an estimate of the timing difference based on the first indication of the timing difference and the at least one second indication of the timing difference.

At block 804, the apparatus identifies a cell that provides timing for a CSI-RS. For example, the apparatus may generate an indication to inform a UE that the UE may base the timing of the CSI-RS on the timing of a particular cell.

In some scenarios, the identified cell may include (e.g., may be) a serving cell for the UE. Here, in some cases, the CSI-RS may be transmitted by a neighbor cell of the serving cell.

In some scenarios, the identified cell may include (e.g., may be) a neighbor cell of a serving cell for the UE. Here, in some cases, the CSI-RS may be transmitted by the neighbor cell.

At optional block 806, the apparatus may determine a CSI-RS configuration for the CSI-RS. In some aspects, the CSI-RS configuration may include an indication of a sub-carrier spacing of the CSI-RS. In some aspects, the CSI-RS configuration may include an indication of a timing difference taking into account a sub-carrier spacing between a serving cell for the UE and a cell that transmits the CSI-RS.

At block 808, the apparatus sends an indication of the identified cell to a UE. In a case where the apparatus determines a CSI-RS configuration at block 806, the CSI-RS configuration may include the indication of the identified cell. This, in this case, the sending of the indication to the UE at block 808 may include (e.g., may involve) sending the CSI-RS configuration to the UE.

In some aspects, a process in accordance with the teachings herein may include any combination of the above operations and/or features.

Second Example Process

Figure 9:
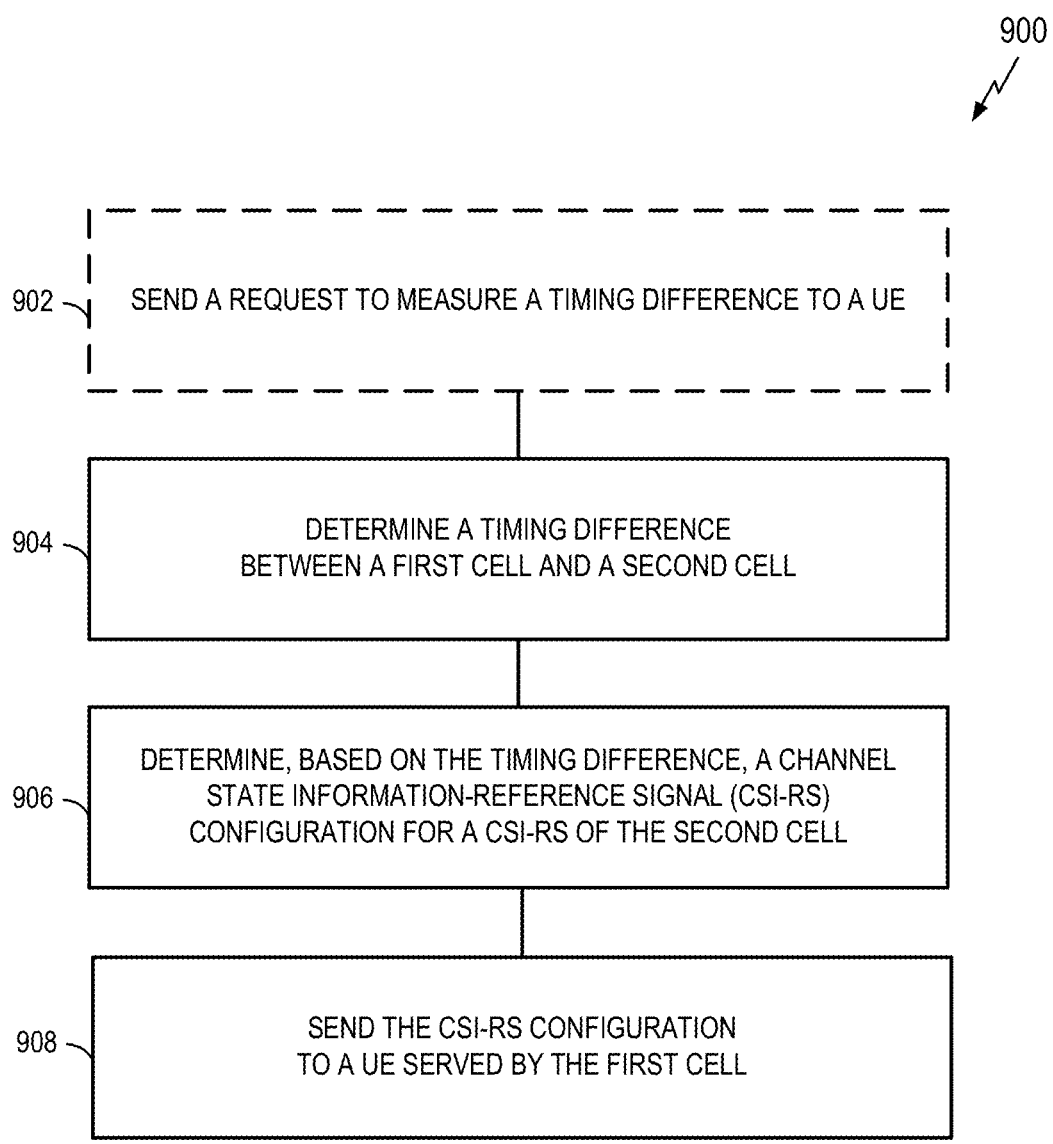
FIG. 9 is a flowchart illustrating an example of a process for providing a CSI-RS configuration in accordance with some aspects of the disclosure.

FIG. 9 illustrates a process 900 for communication in accordance with some aspects of the disclosure. The process 900 may take place within a processing circuit (e.g., the processing circuit 710 of FIG. 7), which may be located in a gNB, a TRP, a base station, a UE, an access terminal, or some other suitable apparatus. Of course, in various aspects within the scope of the disclosure, the process 900 may be implemented by any suitable apparatus capable of supporting communication-related operations (e.g., sidelink operations).

At optional block 902, an apparatus (e.g., a gNB) may send a request to measure a timing difference to a UE. For example, a serving cell may instruct a served UE to estimate a symbol timing difference.

At block 904, the apparatus determines a timing difference between a first cell (e.g., a serving cell) and a second cell (e.g., a neighbor cell). For example, the apparatus may receive an indication of the timing difference from a UE.

At block 906, the apparatus determines, based on the timing difference, a channel state information-reference signal (CSI-RS) configuration for a CSI-RS of the second cell.

At block 908, the apparatus sends the CSI-RS configuration to a UE served by the first cell.

In some aspects, the CSI-RS configuration may include an indication that timing for the CSI-RS of the second cell is based on timing of the first cell. In some aspects, the CSI-RS configuration may include an indication that timing for the CSI-RS of the second cell is based on timing of the second cell. In some aspects, the timing difference may include a symbol timing difference, a slot timing difference, a mini-slot timing difference, a system frame number timing difference, or any combination thereof. In some aspects, the CSI-RS configuration may include an indication of the timing difference. In some aspects, the CSI-RS configuration may include an indication of a timing difference taking into account a sub-carrier spacing between the first cell and the second cell. In some aspects, the CSI-RS configuration may include a scrambling identifier associated with the CSI-RS of the second cell. In some aspects, the CSI-RS configuration may include a seed for obtaining a scrambling identifier associated with the CSI-RS of the second cell. In some aspects, the CSI-RS configuration may include an indication of whether the CSI-RS of the second cell uses one scrambling sequence or different scrambling sequences over a set of symbols. In some aspects, the CSI-RS configuration may include a seed for obtaining a scrambling identifier associated with the CSI-RS of the second cell. In some aspects, the CSI-RS configuration may include an indication that the CSI-RS of the second cell uses one scrambling sequence over a set of symbols. In some aspects, the determination of the timing difference may include receiving an indication of the timing difference from the UE. In some aspects, the process 900 may further include sending a request to measure the timing difference to the UE. In some aspects, the determination of the timing difference may include: receiving a first indication of the timing difference from the UE and at least one second indication of the timing difference from at least one other UE; and generating an estimate of the timing difference based on the first indication of the timing difference and the at least one second indication of the timing difference.

In some aspects, a process in accordance with the teachings herein may include any combination of the above operations and/or features.

Third Example Process

Figure 10:
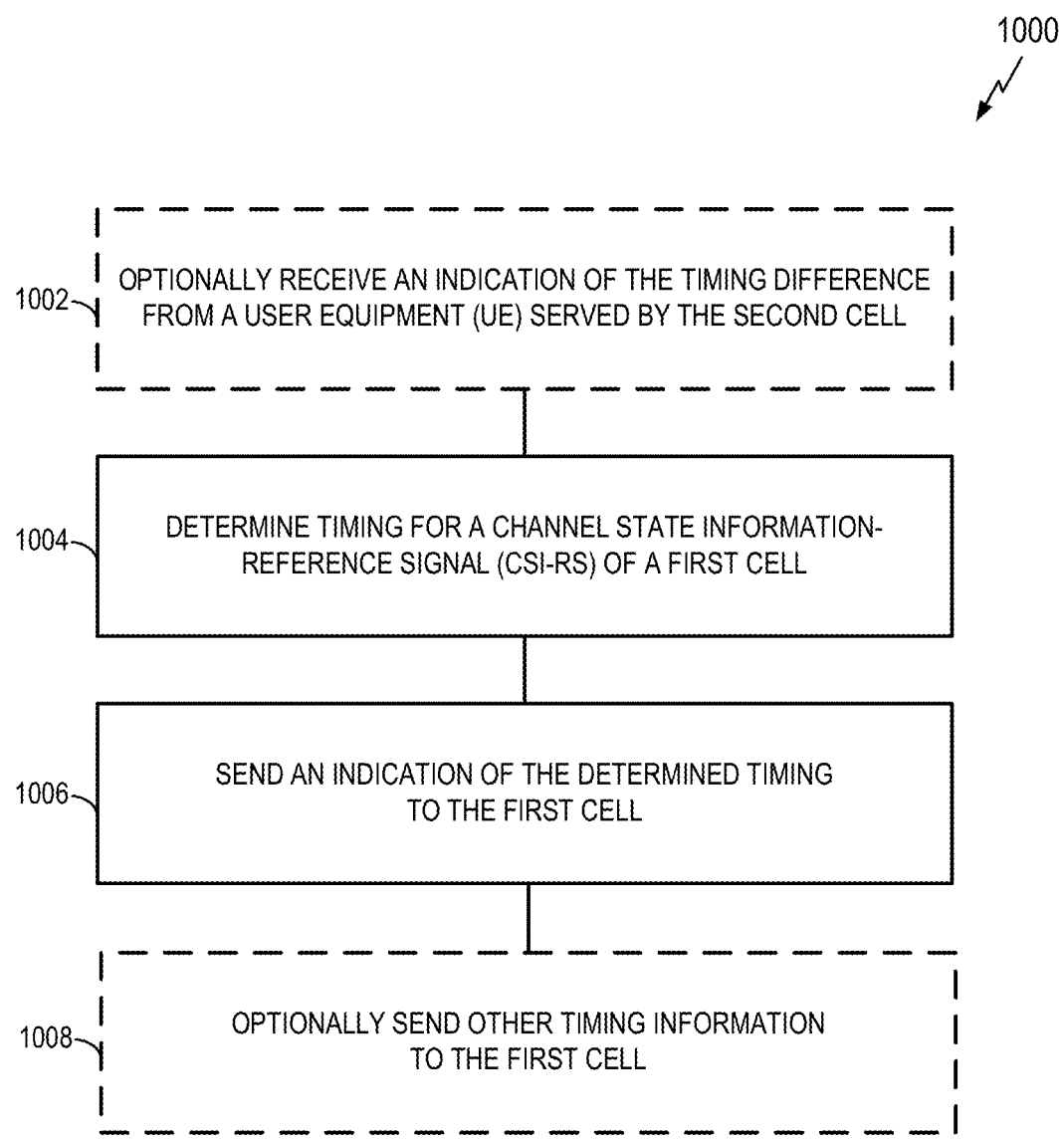
FIG. 10 is a flowchart illustrating an example of a process for communicating timing information in accordance with some aspects of the disclosure.

FIG. 10 illustrates a process 1000 for communication in accordance with some aspects of the disclosure. The process 1000 may take place within a processing circuit (e.g., the processing circuit 710 of FIG. 7), which may be located in a gNB, a TRP, a base station, a network node, a UE, an access terminal, or some other suitable apparatus. Of course, in various aspects within the scope of the disclosure, the process 1000 may be implemented by any suitable apparatus capable of supporting communication-related operations.

At optional block 1002, an apparatus (e.g., a gNB or a network node) may receive an indication of a timing difference from a user equipment (UE). For example, a first cell may receive the indication from a UE served by a second cell.

At block 1004, the apparatus determines timing for a channel state information-reference signal (CSI-RS) of a first cell.

At block 1006, the apparatus sends an indication of the determined timing to the first cell.

At optional block 1008, the apparatus may send other timing information to the first cell.

In some aspects, the determination of the timing may include determining whether the first cell is to transmit the CSI-RS based on timing of the first cell or timing of a second cell. In some aspects, the indication may indicate when the first cell is to transmit the CSI-RS. In some aspects, the indication may include at least one offset between transmission of the CSI-RS by the first cell and transmission of at least one CSI-RS by at least one other cell. In some aspects, the indication may indicate that the first cell is to transmit the CSI-RS based on timing of a second cell.

In some aspects, the process 1000 may further include sending to the first cell an indication of a timing difference between the first cell and a second cell to be used for transmission of the CSI-RS by the first cell. In some aspects, the process 1000 may further include receiving the indication of the timing difference from a user equipment (UE) served by the second cell. In some aspects, the process 1000 may further include sending a request to measure the timing difference to the UE. In some aspects, the timing difference may include a symbol timing difference, a slot timing difference, a mini-slot timing difference, a system frame number timing difference, or any combination thereof. In some aspects, the process 1000 may further include sending to the first cell an indication that transmission of the CSI-RS by the first cell is to use one scrambling sequence over a set of symbols. In some aspects, the process 1000 may further include sending to the first cell an indication that transmission of the CSI-RS by the first cell is to use different scrambling sequences over a set of symbols. In some aspects, the process 1000 may further include determining other timing for another CSI-RS of a second cell; and generating the indication to specify that the timing for the CSI-RS of the first cell does not overlap the other timing for the other CSI-RS of the second cell.

In some aspects, a process in accordance with the teachings herein may include any combination of the above operations and/or features.

Second Example Apparatus

Figure 11:
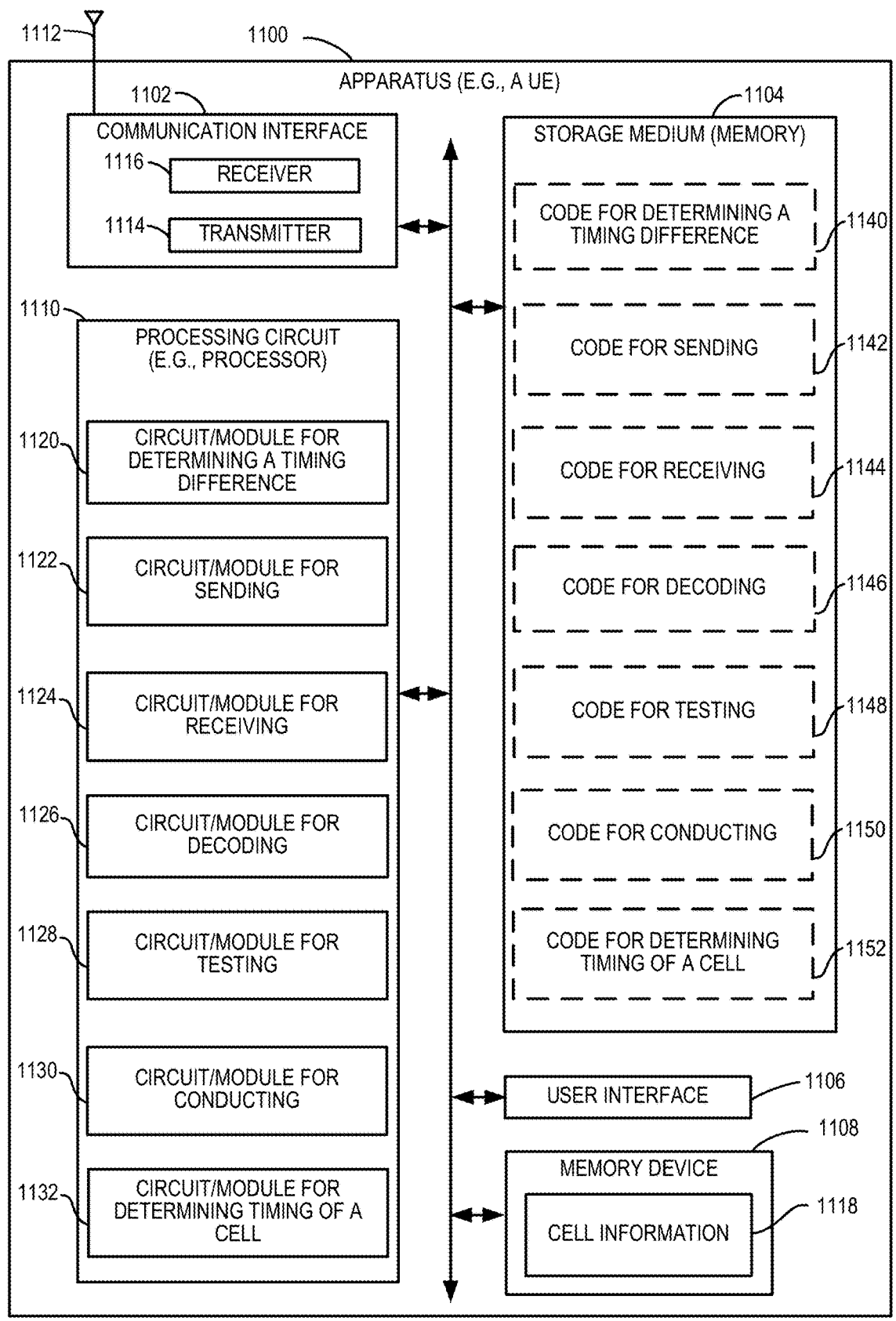
FIG. 11 is a block diagram illustrating another example hardware implementation for an apparatus (e.g., an electronic device) that can support communication in accordance with some aspects of the disclosure.

FIG. 11 illustrates a block diagram of an example hardware implementation of an apparatus 1100 configured to communicate according to one or more aspects of the disclosure. The apparatus 1100 could embody or be implemented within a UE, a gNB, a transmit receive point (TRP), an access point, or some other type of device that supports wireless communication (e.g., with reference signals) as taught herein. In various implementations, the apparatus 1100 could embody or be implemented within an access terminal, a base station, or some other type of device. In various implementations, the apparatus 1100 could embody or be implemented within a mobile phone, a smart phone, a tablet, a portable computer, a personal computer, a sensor, an alarm, a vehicle, a machine, a server, a network entity, an entertainment device, a medical device, or any other electronic device having circuitry.

The apparatus 1100 includes a communication interface 1102 (e.g., at least one transceiver), a storage medium 1104, a user interface 1106, a memory device 1108 (e.g., storing cell information 1118), and a processing circuit 1110 (e.g., at least one processor). In various implementations, the user interface 1106 may include one or more of: a keypad, a display, a speaker, a microphone, a touchscreen display, of some other circuitry for receiving an input from or sending an output to a user. The communication interface 1102 may be coupled to one or more antennas 1112, and may include a transmitter 1114 and a receiver 1116. In general, the components of FIG. 11 may be similar to corresponding components of the apparatus 700 of FIG. 7.

According to one or more aspects of the disclosure, the processing circuit 1110 may be adapted to perform any or all of the features, processes, functions, operations and/or routines for any or all of the apparatuses described herein. For example, the processing circuit 1110 may be configured to perform any of the steps, functions, and/or processes described with respect to FIGS. 1-6, 12, and 13. As used herein, the term "adapted" in relation to the processing circuit 1110 may refer to the processing circuit 1110 being one or more of configured, used, implemented, and/or programmed to perform a particular process, function, operation and/or routine according to various features described herein.

The processing circuit 1110 may be a specialized processor, such as an application specific integrated circuit (ASIC) that serves as a means for (e.g., structure for) carrying out any one of the operations described in conjunction with FIGS. 1-6, 12, and 13. The processing circuit 1110 may serve as one example of a means for transmitting and/or a means for receiving. In various implementations, the processing circuit 1110 may provide and/or incorporate, at least in part, the functionality described above for the first device 202 of FIG. 2.

According to at least one example of the apparatus 1100, the processing circuit 1110 may include one or more of a circuit/module for determining a timing difference 1120, a circuit/module for sending 1122, a circuit/module for receiving 1124, a circuit/module for decoding 1126, a circuit/module for testing 1128, a circuit/module for conducting 1130, or a circuit/module for determining timing of a cell 1132. In various implementations, the circuit/module for determining a timing difference 1120, the circuit/module for sending 1122, the circuit/module for receiving 1124, the circuit/module for decoding 1126, the circuit/module for testing 1128, the circuit/module for conducting 1130, or the circuit/module for determining timing of a cell 1132 may provide and/or incorporate, at least in part, the functionality described above for the first device 202 of FIG. 2.

As mentioned above, programming stored by the storage medium 1104, when executed by the processing circuit 1110, causes the processing circuit 1110 to perform one or more of the various functions and/or process operations described herein. For example, the programming may cause the processing circuit 1110 to perform the various functions, steps, and/or processes described herein with respect to FIGS. 1-6, 12, and 13 in various implementations. As shown in FIG. 11, the storage medium 1104 may include one or more of code for determining a timing difference 1140, code for sending 1142, code for receiving 1144, code for decoding 1146, code for testing 1148, code for conducting 1150, or code for determining timing of a cell 1152. In various implementations, the code for determining a timing difference 1140, the code for sending 1142, the code for receiving 1144, the code for decoding 1146, the code for testing 1148, the code for conducting 1150, or the code for determining timing of a cell 1152 may be executed or otherwise used to provide the functionality described herein for the circuit/module for determining a timing difference 1120, the circuit/module for sending 1122, the circuit/module for receiving 1124, the circuit/module for decoding 1126, the circuit/module for testing 1128, the circuit/module for conducting 1130, or the circuit/module for determining timing of a cell 1132.

Fourth Example Process

Figure 12:
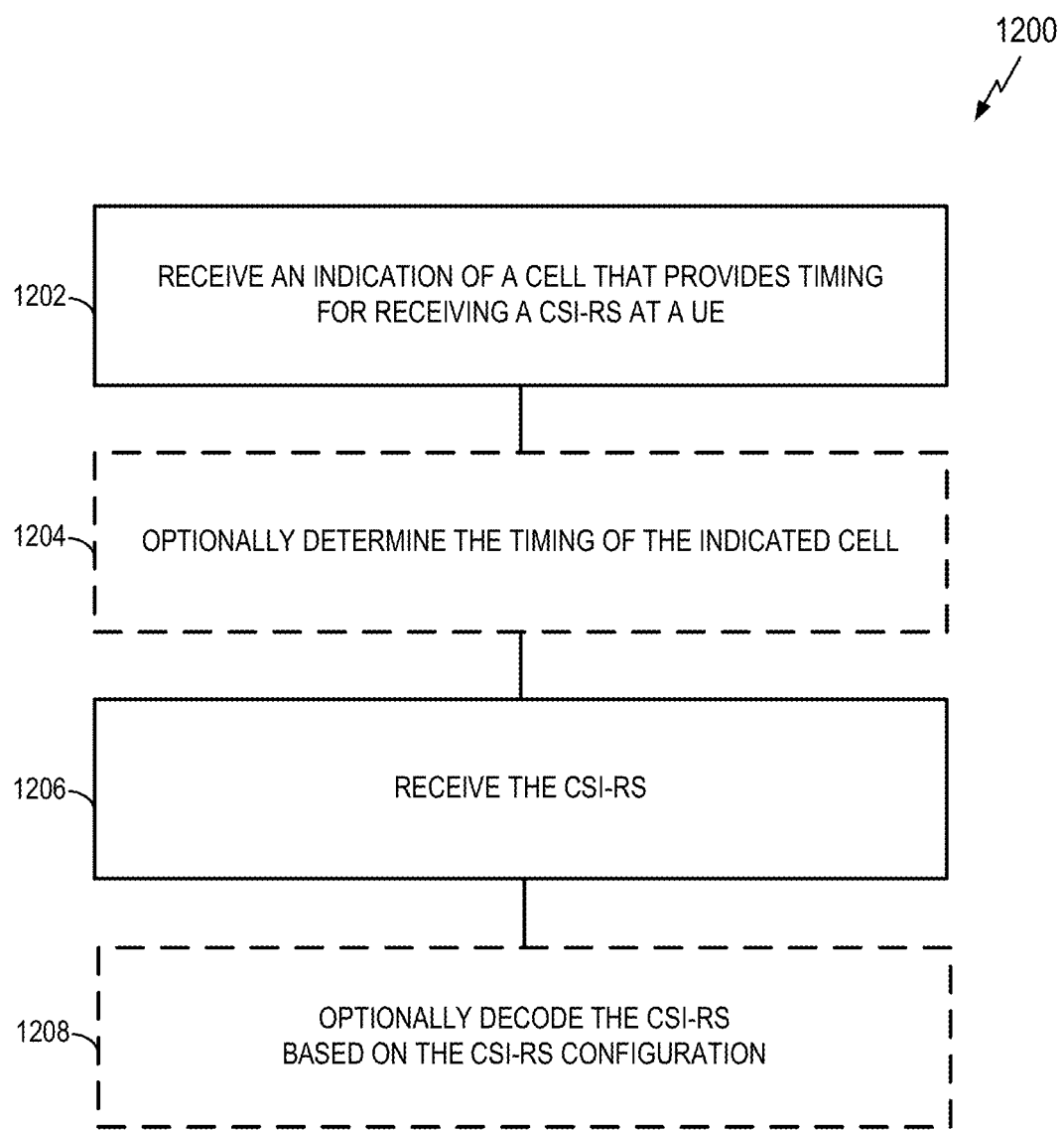
FIG. 12 is a flowchart illustrating an example of a process for acquiring a CSI-RS in accordance with some aspects of the disclosure.

FIG. 12 illustrates a process 1200 for communication in accordance with some aspects of the disclosure. The process 1200 may take place within a processing circuit (e.g., the processing circuit 1110 of FIG. 11), which may be located in a UE, an access terminal, a gNB, a TRP, a base station, or some other suitable apparatus. Of course, in various aspects within the scope of the disclosure, the process 1200 may be implemented by any suitable apparatus capable of supporting communication-related operations.

At block 1202, an apparatus (e.g., a UE) receives an indication of a cell that provides timing for receiving a channel state information-reference signal (CSI-RS) at a user equipment (UE).

In some scenarios, the indicated cell may include (e.g., may be) a serving cell for the UE. Here, in some cases, the CSI-RS may be transmitted by a neighbor cell of the serving cell.

In some scenarios, the indicated cell may include (e.g., may be) a neighbor cell of a serving cell for the UE. Here, in some cases, the CSI-RS may be transmitted by the neighbor cell.

At optional block 1204, the apparatus may determine the timing of the indicated cell. In this case, the receipt of the CSI-RS at block 1206 may be based on the determined timing At block 1206, the apparatus receives the CSI-RS. The cell that provides timing may be the cell transmitting the CSI-RS or some other cell. Thus, in some cases the apparatus receives the CSI-RS from the indicated cell, while in other cases the apparatus receives the CSI-RS from another cell. In some scenarios, the receipt of the indication may involve receiving a CSI-RS configuration for the CSI-RS that includes the indication. In some aspects, the CSI-RS configuration may include an indication of a sub-carrier spacing of the CSI-RS. In some aspects, the CSI-RS configuration may include an indication of a timing difference taking into account a sub-carrier spacing between a serving cell for the UE and a cell that transmits the CSI-RS.

At optional block 1208, the apparatus may decode the CSI-RS based on the CSI-RS configuration. In some aspects, the decoding may include determining a scrambling sequence based on the CSI-RS configuration, and decoding the CSI-RS based on the scrambling sequence.

In some aspects, the CSI-RS configuration may be based on a timing difference between a serving cell for the UE and the indicated cell. In some aspects, the process 1200 may further include determining the timing difference, and sending an indication of the timing difference to the serving cell.

In some aspects, the process 1200 may further include conducting a mobility operation associated with the indicated cell based on the CSI-RS.

In some aspects, a process in accordance with the teachings herein may include any combination of the above operations and/or features.

Fifth Example Process

Figure 13:
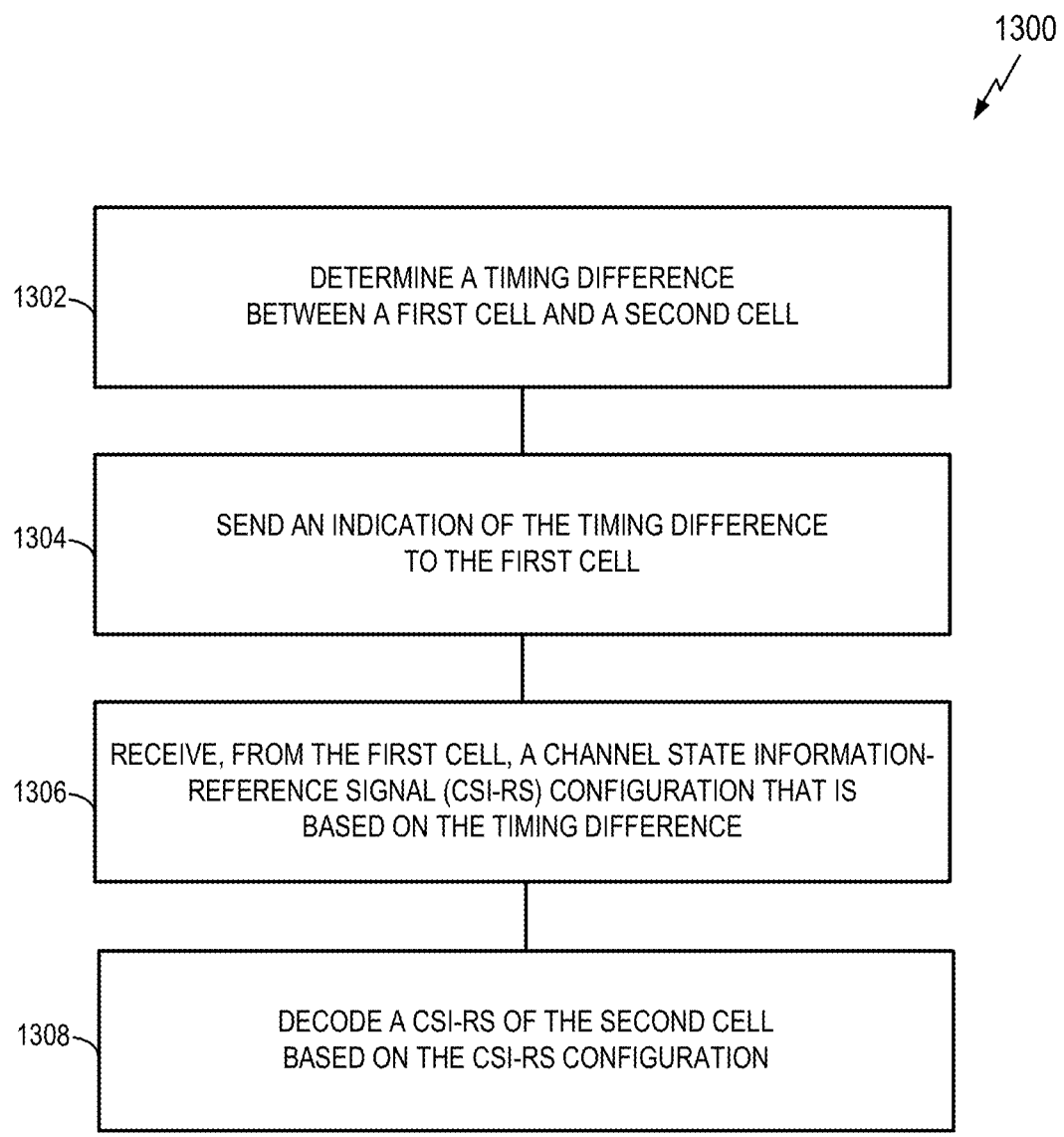
FIG. 13 is a flowchart illustrating an example of a process for acquiring a CSI-RS in accordance with some aspects of the disclosure.

FIG. 13 illustrates a process 1300 for communication in accordance with some aspects of the disclosure. The process 1300 may take place within a processing circuit (e.g., the processing circuit 1110 of FIG. 11), which may be located in a UE, an access terminal, a gNB, a TRP, a base station, or some other suitable apparatus. Of course, in various aspects within the scope of the disclosure, the process 1300 may be implemented by any suitable apparatus capable of supporting communication-related operations.

At block 1302, an apparatus (e.g., a UE) determines a timing difference between a first cell and a second cell. For example, a UE may determine a symbol timing difference based on NR-SSs received from the first cell and NR-SSs received from the second cell.

At block 1304, the apparatus sends an indication of the timing difference to the first cell.

At block 1306, the apparatus receives, from the first cell, a channel state information-reference signal (CSI-RS) configuration that is based on the timing difference.

At block 1308, the apparatus decodes a CSI-RS of the second cell based on the CSI-RS configuration. In some aspects, the decoding may include determining a scrambling sequence based on the CSI-RS configuration; and decoding the CSI-RS of the second cell based on the scrambling sequence.

In some aspects, the CSI-RS configuration may include an indication that timing for the CSI-RS of the second cell is based on timing of the first cell. In some aspects, the CSI-RS configuration may include an indication that timing for the CSI-RS of the second cell is based on timing of the second cell. In some aspects, the timing difference may include a symbol timing difference, a slot timing difference, a mini-slot timing difference, a system frame number timing difference, or any combination thereof. In some aspects, the CSI-RS configuration may include an indication of the timing difference. In some aspects, the CSI-RS configuration may include timing information based on the timing difference. In some aspects, the CSI-RS configuration may include a scrambling identifier associated with the CSI-RS of the second cell. In some aspects, the CSI-RS configuration may include a seed for obtaining a scrambling identifier associated with the CSI-RS of the second cell. In some aspects, the CSI-RS configuration may include an indication that the CSI-RS of the second cell uses one scrambling sequence over a set of symbols. In some aspects, the CSI-RS configuration may include an indication that the CSI-RS of the second cell uses different scrambling sequences over a set of symbols.

In some aspects, the process 1300 may further include testing a plurality of sequence hypotheses over the set of symbols as a result of receiving the indication in the CSI-RS configuration.

In some aspects, the process 1300 may further include conducting a mobility operation associated with the second cell based on the CSI-RS of the second cell.

In some aspects, a process in accordance with the teachings herein may include any combination of the above operations and/or features.

Third Example Apparatus

Figure 14:
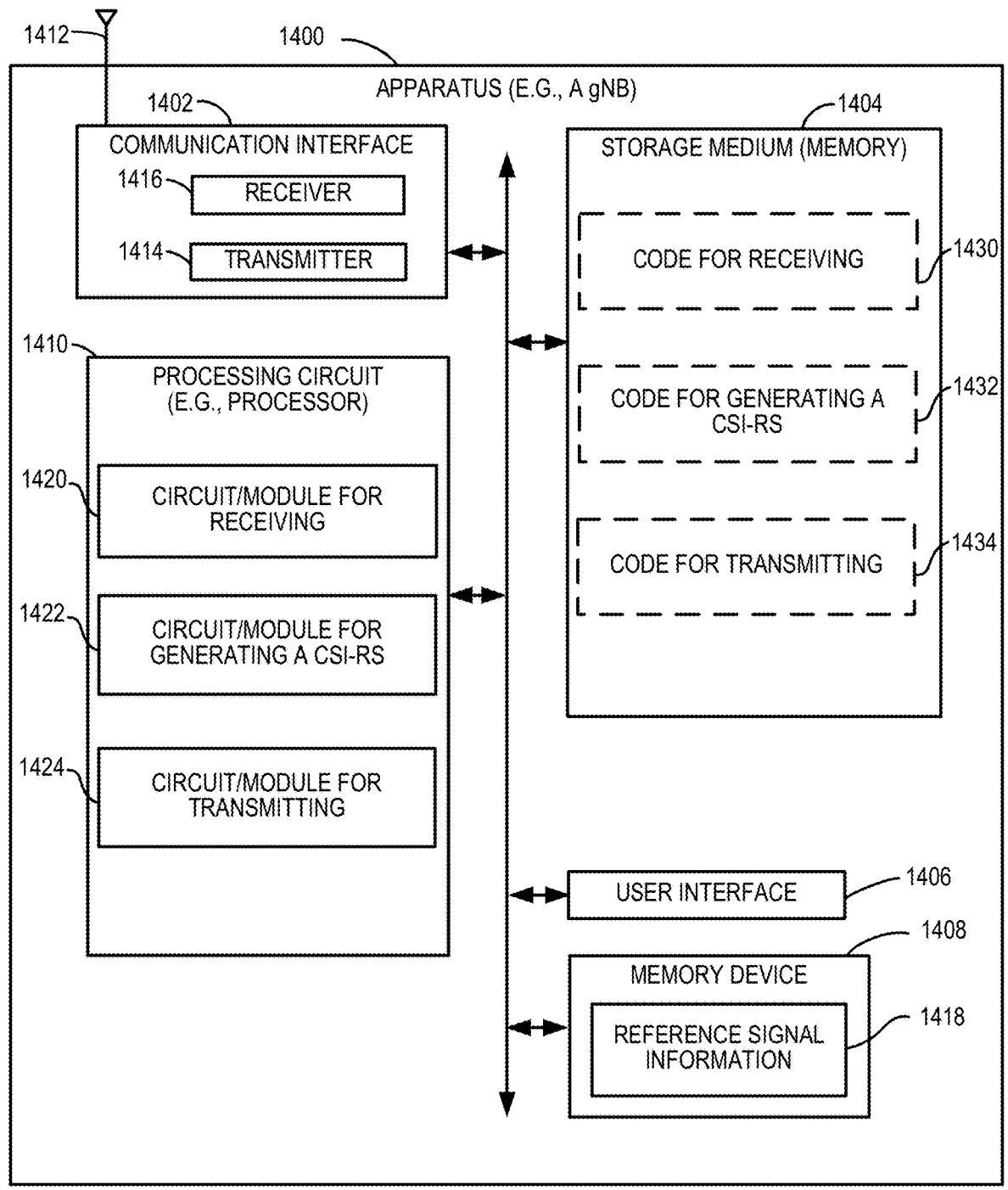
FIG. 14 is a block diagram illustrating another example hardware implementation for an apparatus (e.g., an electronic device) that can support communication in accordance with some aspects of the disclosure.

FIG. 14 illustrates a block diagram of an example hardware implementation of an apparatus 1400 configured to communicate according to one or more aspects of the disclosure. The apparatus 1400 could embody or be implemented within a gNB, a UE, a transmit receive point (TRP), an access point, or some other type of device that supports wireless communication (e.g., with reference signals) as taught herein. In various implementations, the apparatus 1400 could embody or be implemented within a base station, an access terminal, or some other type of device. In various implementations, the apparatus 1400 could embody or be implemented within a server, a network entity, a mobile phone, a smart phone, a tablet, a portable computer, a personal computer, a sensor, an alarm, a vehicle, a machine, an entertainment device, a medical device, or any other electronic device having circuitry.

The apparatus 1400 includes a communication interface 1402 (e.g., at least one transceiver), a storage medium 1404, a user interface 1406, a memory device 1408 (e.g., storing reference signal information 1418), and a processing circuit 1410 (e.g., at least one processor). In various implementations, the user interface 1406 may include one or more of: a keypad, a display, a speaker, a microphone, a touchscreen display, of some other circuitry for receiving an input from or sending an output to a user. The communication interface 1402 may be coupled to one or more antennas 1412, and may include a transmitter 1414 and a receiver 1416. In general, the components of FIG. 14 may be similar to corresponding components of the apparatus 700 of FIG. 7.

According to one or more aspects of the disclosure, the processing circuit 1410 may be adapted to perform any or all of the features, processes, functions, operations and/or routines for any or all of the apparatuses described herein. For example, the processing circuit 1410 may be configured to perform any of the steps, functions, and/or processes described with respect to FIGS. 1-6 and 15. As used herein, the term "adapted" in relation to the processing circuit 1410 may refer to the processing circuit 1410 being one or more of configured, used, implemented, and/or programmed to perform a particular process, function, operation and/or routine according to various features described herein.

The processing circuit 1410 may be a specialized processor, such as an application specific integrated circuit (ASIC) that serves as a means for (e.g., structure for) carrying out any one of the operations described in conjunction with FIGS. 1-6 and 15. The processing circuit 1410 may serve as one example of a means for transmitting and/or a means for receiving. In various implementations, the processing circuit 1410 may provide and/or incorporate, at least in part, the functionality described above for the neighbor cell 206 of FIG. 2.

According to at least one example of the apparatus 1400, the processing circuit 1410 may include one or more of a circuit/module for receiving 1420, a circuit/module for generating a CSI-RS 1422, or a circuit/module for transmitting 1424. In various implementations, the circuit/module for receiving 1420, the circuit/module for generating a CSI-RS 1422, or the circuit/module for transmitting 1424 may provide and/or incorporate, at least in part, the functionality described above for the neighbor cell 206 of FIG. 2.

As mentioned above, programming stored by the storage medium 1404, when executed by the processing circuit 1410, causes the processing circuit 1410 to perform one or more of the various functions and/or process operations described herein. For example, the programming may cause the processing circuit 1410 to perform the various functions, steps, and/or processes described herein with respect to FIGS. 1-6 and 15 in various implementations. As shown in FIG. 14, the storage medium 1404 may include one or more of code for receiving 1430, code for generating a CSI-RS 1432, or code for transmitting 1434. In various implementations, the code for receiving 1430, the code for generating a CSI-RS 1432, or the code for transmitting 1434 may be executed or otherwise used to provide the functionality described herein for the circuit/module for receiving 1420, the circuit/module for generating a CSI-RS 1422, or the circuit/module for transmitting 1424.

Sixth Example Process

Figure 15:
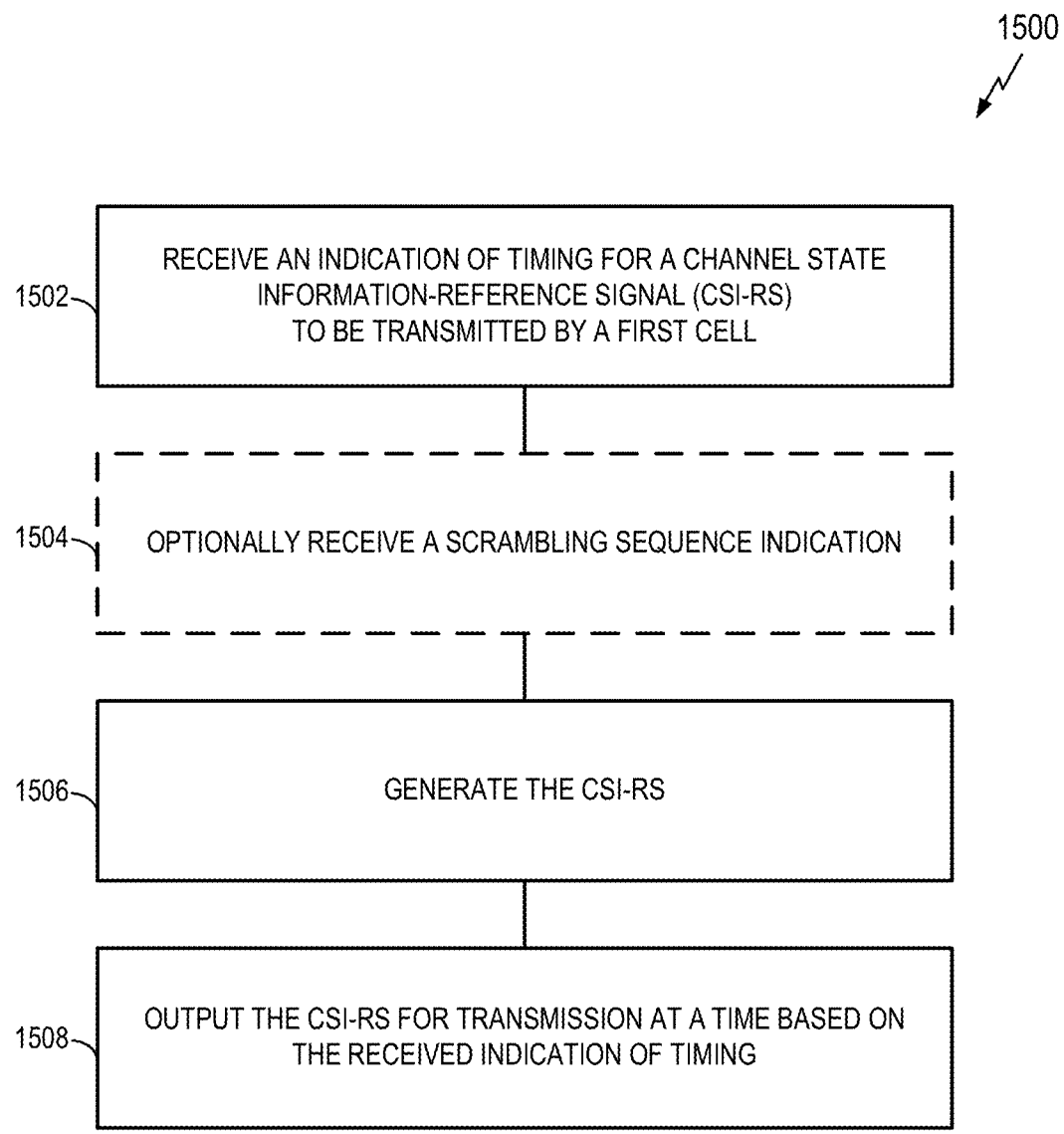
FIG. 15 is a flowchart illustrating an example of a process for providing CSI-RS in accordance with some aspects of the disclosure.

FIG. 15 illustrates a process 1500 for communication in accordance with some aspects of the disclosure. The process 1500 may take place within a processing circuit (e.g., the processing circuit 1410 of FIG. 14), which may be located in a UE, an access terminal, a gNB, a TRP, a base station, or some other suitable apparatus. Of course, in various aspects within the scope of the disclosure, the process 1500 may be implemented by any suitable apparatus capable of supporting communication-related operations.

At block 1502, an apparatus (e.g., a gNB) receives an indication of timing for a channel state information-reference signal (CSI-RS) to be transmitted by a first cell.

At optional block 1504, the apparatus may receive a scrambling sequence indication.

At block 1506, the apparatus generates the CSI-RS.

At block 1508, the apparatus outputs the CSI-RS for transmission at a time based on the received indication of timing.

In some aspects, the indication may indicate when the first cell is to transmit the CSI-RS. In some aspects, the indication may include at least one offset between transmission of the CSI-RS by the first cell and transmission of at least one CSI-RS by at least one other cell. In some aspects, the indication may indicate that the first cell is to transmit the CSI-RS based on timing of the first cell. In some aspects, the indication may indicate that the first cell is to transmit the CSI-RS based on timing of a second cell. In some aspects, the indication may indicate a timing difference between the first cell and a second cell to be used for transmission of the CSI-RS by the first cell. In some aspects, the timing difference may include a symbol timing difference, a slot timing difference, a mini-slot timing difference, a system frame number timing difference, or any combination thereof. In some aspects, the process 1500 may further include receiving another indication that transmission of the CSI-RS by the first cell is to use one scrambling sequence over a set of symbols, wherein the transmission of the CSI-RS by the first cell uses one scrambling sequence over a set of symbols as a result of receiving the other indication. In some aspects, the process 1500 may further include receiving another indication that transmission of the CSI-RS by the first cell is to use different scrambling sequences over a set of symbols, wherein the transmission of the CSI-RS by the first cell uses different scrambling sequences over a set of symbols as a result of receiving the other indication.

In some aspects, a process in accordance with the teachings herein may include any combination of the above operations and/or features.

Additional Aspects

In some aspects, the disclosure provides a method of communication including: determining a timing difference between a first cell and a second cell; determining, based on the timing difference, a channel state information-reference signal (CSI-RS) configuration for a CSI-RS of the second cell; and sending the CSI-RS configuration to a user equipment (UE) served by the first cell.

In some aspects, the disclosure provides an apparatus for communication, including: a memory device and a processing circuit coupled to the memory. The processing circuit is configured to: determine a timing difference between a first cell and a second cell; determine, based on the timing difference, a channel state information-reference signal (CSI-RS) configuration for a CSI-RS of the second cell; and send the CSI-RS configuration to a user equipment (UE) served by the first cell.

In some aspects, the disclosure provides an apparatus configured for communication. The apparatus including: means for determining a timing difference between a first cell and a second cell; means for determining, based on the timing difference, a channel state information-reference signal (CSI-RS) configuration for a CSI-RS of the second cell; and means for sending the CSI-RS configuration to a user equipment (UE) served by the first cell.

In some aspects, the disclosure provides a non-transitory computer-readable medium storing computer-executable code, including code to: determine a timing difference between a first cell and a second cell; determine, based on the timing difference, a channel state information-reference signal (CSI-RS) configuration for a CSI-RS of the second cell; and send the CSI-RS configuration to a user equipment (UE) served by the first cell.

In some aspects, the disclosure provides a method of communication including: determining a timing difference between a first cell and a second cell; sending an indication of the timing difference to the first cell; receiving, from the first cell, a channel state information-reference signal (CSI-RS) configuration that is based on the timing difference; and decoding a CSI-RS of the second cell based on the CSI-RS configuration.

In some aspects, the disclosure provides an apparatus for communication, including: a memory device and a processing circuit coupled to the memory. The processing circuit is configured to: determine a timing difference between a first cell and a second cell; send an indication of the timing difference to the first cell; receive, from the first cell, a channel state information-reference signal (CSI-RS) configuration that is based on the timing difference; and decode a CSI-RS of the second cell based on the CSI-RS configuration.

In some aspects, the disclosure provides an apparatus configured for communication. The apparatus including: means for determining a timing difference between a first cell and a second cell; means for sending an indication of the timing difference to the first cell; means for receiving, from the first cell, a channel state information-reference signal (CSI-RS) configuration that is based on the timing difference; and means for decoding a CSI-RS of the second cell based on the CSI-RS configuration.

In some aspects, the disclosure provides a non-transitory computer-readable medium storing computer-executable code, including code to: determine a timing difference between a first cell and a second cell; send an indication of the timing difference to the first cell; receive, from the first cell, a channel state information-reference signal (CSI-RS) configuration that is based on the timing difference; and decode a CSI-RS of the second cell based on the CSI-RS configuration.

In some aspects, the disclosure provides a method of communication including: determining timing for a channel state information-reference signal (CSI-RS) of a first cell; and sending an indication of the determined timing to the first cell.

In some aspects, the disclosure provides an apparatus for communication, including: a memory device and a processing circuit coupled to the memory. The processing circuit is configured to: determine timing for a channel state information-reference signal (CSI-RS) of a first cell; and send an indication of the determined timing to the first cell.

In some aspects, the disclosure provides an apparatus configured for communication. The apparatus including: means for determining timing for a channel state information-reference signal (CSI-RS) of a first cell; and means for sending an indication of the determined timing to the first cell.

In some aspects, the disclosure provides a non-transitory computer-readable medium storing computer-executable code, including code to: determine timing for a channel state information-reference signal (CSI-RS) of a first cell; and send an indication of the determined timing to the first cell.

In some aspects, the disclosure provides a method of communication including: receiving an indication of timing for a channel state information-reference signal (CSI-RS) to be transmitted by a first cell; generating the CSI-RS; and outputting the CSI-RS for transmission at a time based on the received indication of timing.

In some aspects, the disclosure provides an apparatus for communication, including: a memory device and a processing circuit coupled to the memory. The processing circuit is configured to: receive an indication of timing for a channel state information-reference signal (CSI-RS) to be transmitted by a first cell; generate the CSI-RS; and output the CSI-RS for transmission at a time based on the received indication of timing.

In some aspects, the disclosure provides an apparatus configured for communication. The apparatus including: means for receiving an indication of timing for a channel state information-reference signal (CSI-RS) to be transmitted by a first cell; means for generating the CSI-RS; and means for outputting the CSI-RS for transmission at a time based on the received indication of timing.

In some aspects, the disclosure provides a non-transitory computer-readable medium storing computer-executable code, including code to: receive an indication of timing for a channel state information-reference signal (CSI-RS) to be transmitted by a first cell; generate the CSI-RS; and output the CSI-RS for transmission at a time based on the received indication of timing.

Other Aspects

The examples set forth herein are provided to illustrate certain concepts of the disclosure. Those of ordinary skill in the art will comprehend that these are merely illustrative in nature, and other examples may fall within the scope of the disclosure and the appended claims.

As those skilled in the art will readily appreciate, various aspects described throughout this disclosure may be extended to any suitable telecommunication system, network architecture, and communication standard. By way of example, various aspects may be applied to 3GPP 5G systems and/or other suitable systems, including those described by yet-to-be defined wide area network standards. Various aspects may also be applied to systems using LTE (in FDD, TDD, or both modes), LTE-Advanced (LTE-A) (in FDD, TDD, or both modes), Universal Mobile Telecommunications System (UMTS), Global System for Mobile Communications (GSM), Code Division Multiple Access (CDMA), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. Various aspects may also be applied to UMTS systems such as W-CDMA, TD-SCDMA, and TD-CDMA. The actual telecommunication standard, network architecture, and/or communication standard used will depend on the specific application and the overall design constraints imposed on the system.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application-specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects.

Likewise, the term "aspect" does not require that all aspects include the discussed feature, advantage or mode of operation. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may comprise one or more elements. In addition, terminology of the form "at least one of a, b, or c" or "a, b, c, or any combination thereof" used in the description or the claims means "a or b or c or any combination of these elements."

For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication for a base station, comprising:
   determining that a serving cell for a user equipment (UE) is to supply timing for the UE to use to measure a channel state information-reference signal (CSI-RS);
   determining that a neighbor cell of the serving cell is to transmit the CSI-RS;
   determining a timing difference between the serving cell and the neighbor cell;
   as a result of determining that the neighbor cell of the serving cell is to transmit the CSI-RS, sending to the neighbor cell an indication of the timing difference, wherein the timing difference comprises a symbol timing difference;
   generating a CSI-RS configuration for the CSI-RS based on the determining that the serving cell for the UE is to supply the timing for the UE to use to measure the CSI-RS and the determining that the neighbor cell of the serving cell is to transmit the CSI-RS, wherein the CSI-RS configuration comprises an indication that the UE is to use the timing of the serving cell to measure the CSI-RS; and
   transmitting the CSI-RS configuration comprising the indication to the UE.

2. The method of claim 1, wherein the CSI-RS configuration comprises an indication of a sub-carrier spacing of the CSI-RS.

3. The method of claim 1, wherein the timing difference further comprises a slot timing difference, a mini-slot timing difference, a system frame number timing difference, or any combination thereof.

4. The method of claim 1, wherein the determination of the timing difference comprises receiving an indication of the timing difference from the UE.

5. The method of claim 4, further comprising:
   sending a request to measure the timing difference to the UE.

6. The method of claim 1, wherein the determination of the timing difference comprises:
   receiving a first indication of the timing difference from the UE and at least one second indication of the timing difference from at least one other UE; and
   generating an estimate of the timing difference based on the first indication of the timing difference and the at least one second indication of the timing difference.

7. A base station for communication comprising:
   a memory device; and
   a processing circuit coupled to the memory device and configured to:
      determine that a serving cell for a user equipment (UE) is to supply timing for the UE to use to measure a channel state information-reference signal (CSI-RS);
      determine that a neighbor cell of the serving cell is to transmit the CSI-RS;
      determine a timing difference between the serving cell and the neighbor cell;
      as a result of determining that the neighbor cell of the serving cell is to transmit the CSI-RS, send to the neighbor cell an indication of the timing difference, wherein the timing difference comprises a symbol timing difference;
      generate a CSI-RS configuration for the CSI-RS based on the determination that the serving cell for the UE is to supply the timing for the UE to use to measure the CSI-RS and the determination that the neighbor cell of the serving cell is to transmit the CSI-RS, wherein the CSI-RS configuration comprises an indication that the UE is to use the timing of the serving cell to measure the CSI-RS; and
      transmit the CSI-RS configuration comprising the indication to the UE.

8. A method of communication for a user equipment (UE), comprising:
   determining a timing difference between a serving cell of the UE and a neighbor cell of the serving cell;
   sending an indication of the timing difference to the serving cell, wherein the timing difference comprises a symbol timing difference;
   receiving a channel state information-reference signal (CSI-RS) configuration for a CSI-RS to be transmitted by the neighbor cell, wherein the CSI-RS configuration comprises an indication that the UE is to use timing of the serving cell to measure the CSI-RS;
   determining the timing of the serving cell; and
   using the timing of the serving cell to measure the CSI-RS transmitted by the neighbor cell.

9. The method of claim 8, further comprising:
   decoding the CSI-RS based on the CSI-RS configuration.

10. The method of claim 9, wherein the decoding comprises:
    determining a scrambling sequence based on the CSI-RS configuration; and
    decoding the CSI-RS based on the scrambling sequence.

11. The method of claim 8, wherein the CSI-RS configuration comprises an indication of a sub-carrier spacing of the CSI-RS.

12. The method of claim 8, further comprising:
    conducting a mobility operation associated with the neighbor cell based on the CSI-RS.

13. A user equipment, comprising:
    a memory device; and
    a processing circuit coupled to the memory device and configured to:
       determine a timing difference between a serving cell of the UE and a neighbor cell of the serving cell;
       send an indication of the timing difference to the serving cell, wherein the timing difference comprises a symbol timing difference;

receive a channel state information-reference signal (CSI-RS) configuration for a CSI-RS to be transmitted by a neighbor cell of a serving cell for the UE, wherein the CSI-RS configuration comprises an indication that the UE is to use timing of the serving cell to measure the CSI-RS;

determine the timing of the serving cell; and use the timing of the serving cell to measure the CSI-RS transmitted by the neighbor cell.

14. The method of claim 1, further comprising:
sending CSI-RS timing information to the neighbor cell.

* * * * *